United States Patent
Laroia et al.

(10) Patent No.: US 7,420,939 B2
(45) Date of Patent: Sep. 2, 2008

(54) METHODS AND APPARATUS OF POWER CONTROL IN WIRELESS COMMUNICATION SYSTEMS

(75) Inventors: Rajiv Laroia, Basking Ridge, NJ (US); Junyi Li, Bedminster, NJ (US); John L. Fan, Livingston, NJ (US); Sundeep Rangan, Jersey City, NJ (US); Prashanth Hande, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 10/641,308

(22) Filed: Aug. 13, 2003

(65) Prior Publication Data

US 2005/0036441 A1 Feb. 17, 2005

(51) Int. Cl.
*H04B 7/185* (2006.01)
(52) U.S. Cl. .............. 370/318; 370/478; 455/13.4; 455/23; 455/60
(58) Field of Classification Search ............. 370/315, 370/318, 328, 338, 436, 478; 455/13.4, 23, 455/42, 60, 127.1, 522
See application file for complete search history.

(56) References Cited

U.S. PATENT DOCUMENTS

| | | | | |
|---|---|---|---|---|
| 5,923,651 A | * | 7/1999 | Struhsaker | 370/342 |
| 6,160,791 A | * | 12/2000 | Bohnke | 370/208 |
| 6,230,022 B1 | * | 5/2001 | Sakoda et al. | 455/522 |
| 6,396,803 B2 | * | 5/2002 | Hornsby et al. | 370/208 |
| 6,408,038 B1 | * | 6/2002 | Takeuchi | 375/341 |
| 6,587,510 B1 | * | 7/2003 | Minami et al. | 375/285 |
| 2002/0136157 A1 | * | 9/2002 | Takaoka et al. | 370/208 |
| 2002/0145985 A1 | * | 10/2002 | Love et al. | 370/328 |

OTHER PUBLICATIONS

PCT International Search Report, International Application No. PCT/US03/25832, Aug. 13, 2003.

* cited by examiner

*Primary Examiner*—Chi H. Pham
*Assistant Examiner*—Donald L Mills
(74) *Attorney, Agent, or Firm*—Michael P. Straub; Donald C. Kordich; Thomas R. Rouse

(57) ABSTRACT

The present invention involves apparatus and methods to perform wireless terminal transmission power control. The invention uses novel and highly efficient methods to: convey power control information, specify power control level adjustments, recognize power control information, limit interference in the power control signaling, and recognize corrupted power control signaling, thus conserving wireless terminal energy and minimizing power control signaling and associated bandwidth. Base stations send analog power control command signals, with a continuous range of control levels, to wireless terminals for transmission power adjustments. Power control signals include two components which can be used to convey information, e.g., power control commands, signal quality, device identity information. For zero power adjustment, the control component signal is not transmitted. For a non-zero adjustment, power control signals are sent using control ranges and limits, known to the base station and wireless terminal, with the scaling adjusted or synchronized based upon feedback information.

79 Claims, 10 Drawing Sheets

METHODS AND APPARATUS OF POWER CONTROL IN WIRELESS COMMUNICATION SYSTEMS

FIELD OF THE INVENTION

The present invention is directed to wireless communications systems and more particularly, to methods and apparatus for performing power control of wireless terminals in an efficient and improved manner.

BACKGROUND OF THE INVENTION

In a wireless communication system, e.g., a cellular system, power control is an important consideration in design and operation of the wireless system. Power levels throughout the system directly affect the levels of interference that users experience when trying to communicate over the wireless links. In a wireless communications system, many wireless terminals operate on batteries, which have a limited energy storage level, which when expended, requires a battery recharge or replacement. This limited energy storage level corresponds to a limited and specific wireless terminal power on time, at a specific operational power level. If the wireless terminal's, operational power level can be reduced, the wireless terminal's operational life can be extended. Therefore, it is highly desirable for wireless terminals to conserve power whenever possible so as extend and maximize their useful operational life between battery recharges or replacements. If a wireless terminal is transmitting on a power level that is excess of its requirements, it is both wasting valuable energy and creating an unnecessarily high signal level, which may interfere with other users in the same cell and/or sector or adjacent cell and/or sector. The other user that is experiencing the interference may have to expend additional power to overcome the interference or one of the users may have to be switched to another channel to overcome the interference.

Power control signaling has been used in wireless systems. However, the methods employed have not been highly efficient and there is significant room for improvement. Wireless terminals may be commanded to transmit at different power levels to accommodate different burst data rates or to achieve different levels of signal reliability. Wireless terminals are in many cases mobile devices, moving throughout a system and experiencing different power requirements at different locations due to, e.g., variations such as range from base station, obstructions in the communications path, etc. In addition, as a plurality of wireless terminals operate in the system, the levels of interference experienced between those wireless terminals may vary disrupting communications with the base station and may require transmission power adjustments of the wireless terminals to overcome the interference levels for efficient and sustained communications with the base station. The inefficiencies in present systems result in high levels of signaling required to convey precise and current power control information between the base station and the wireless terminals. As the level of signaling dedicated to power control between the wireless terminal and the base station increases, communications bandwidth that could have been dedicated to other purposes, e.g, the communication of user data, is lost to power control signaling. This generally results in system trade-off choices of better power control with the advantages of conservation of batteries, lower levels of interference, and a more robust channel or more available bandwidth for more users, higher data transmissions rates, etc. Based upon the above discussion, it is evident that there is a need for improved apparatus power control methods and apparatus that can be used for wireless terminal power control.

SUMMARY OF THE INVENTION

The present invention involves apparatus and methods to perform signaling, e.g., power control signaling, in a Wireless communications system in an improved and efficient manner. More specifically, the invention focuses on wireless terminal transmission power control apparatus and methods. In accordance with the invention, a base station sends control command signals, to a wireless terminal. The control command signals can be for power control, frequency control, or timing control. In the case of power control the signals may correspond to, e.g., a command to adjust a transmission power level by some indicated amount. The amount of an adjustment is usually indicated, in accordance with the invention, by the amplitude of an In-phase or quadrature phase signal component of a single tone transmitted during a single symbol time, e.g., an OFDM symbol transmission time. In the case of frequency control the control command may, and sometime does, correspond to a command to make a frequency adjustment by some indicated amount. In the case of frequency control the control command may, and sometime does, correspond to a command to make a frequency adjustment by some indicated amount. Different components of the same tone may be used to convey different types of information, e.g., the In-phase component of a tone may be used to convey power control information while the Quadrature phase component of the same tone is used to convey timing control, frequency control or other information.

In the following description of the invention, we mainly focus on power control as an exemplary implementation. It is to be understood that other types of control information could be transmitted in accordance with the invention instead of power control information as discussed above.

The wireless terminal then adjusts its transmission power according to the received power control command signals. The present invention is directed to closed-loop power control apparatus and methods that provide improved power control by using novel and efficient methods. The signaling methods of the present invention can be used to convey the power control information, to specify the power control level adjustments, to recognize the power control information, to limit and/or overcome interference to the power control signaling, and/or to recognize corrupted power control signaling. The methods of the invention can reduce the signaling and allocated bandwidth required to achieve a particular level of power control as compared to some known systems. Power control information, e.g., commands may be used to signal that the wireless terminal increase transmission power, leave the transmission power unchanged or decrease transmission power. Different signals may be used to signal different amounts of change in transmission power levels.

Additional signaling features, used in various embodiments of the invention, communicate device (wireless terminal) identity information along with the power control signaling allowing wireless terminals to quickly identify a loss of connection with a base station.

In accordance with the invention, the power control command signals are transmitted using a single tone for a single symbol transmission time period in one orthogonal frequency division multiplexing (OFDM) embodiment. In accordance with one such embodiment, the control symbols referred to as power control symbols, are analog signals including an in-phase and a quadrature component. Each component may be used to convey information. In one embodiment, in-phase component conveys a power control command for a first wireless terminal, while the quadrature component conveys a power control command for a second wireless terminal.

In another embodiment, the in-phase component conveys power control command for a first wireless terminal, and the quadrature component is used at the wireless terminal to measure the quality of the received power control command in the in-phase component. In accordance with the invention, the base station, by not transmitting a component in the quadrature component of the power control signal, e.g., during most of all of the power control signal transmission times, allows the wireless terminal, receiving the signal, to recognize that any quadrature component signal received is due to noise or interference. In such a case, the wireless terminal can examine the quadrature component to evaluate the level of signal interference. The wireless terminal may reasonably assume that if the received quadrature component has a relatively high signal level, then the power control command in the in-phase component of the signal may have experienced a high level of interference, and thus the received power control command is suspect. The wireless terminal can determine the course of action to take based upon the quadrature component signal level with respect to the expected range of in-phase signal power control command levels. For example, if the quadrature component is relatively very low, the interference level is probably low and the command can be treated as being reliable, e.g., accepted and used fully. If the quadrature component is relatively very high, the interference level is probably high and the power control command should be treated as unreliable, e.g., ignored or discarded by the wireless terminal. If the quadrature component is an intermediate level, the wireless terminal, may, and in some embodiments does, perform a transmission power level adjustment which is a fraction of the received power control command.

In accordance with the invention, the power control command from the base station is structured to be in one of 3 or more regions. If no change in power control is desired, the command level is 0. If an increase in wireless terminal transmission power level is desired, the command level is set appropriately within a range [a,b]. If a decrease in power level is desired, the command level is set appropriately within a range [−b,−a], where $0 > a \geq b$. Command level a corresponds to a requested increase in wireless terminal transmission power level by $P_a$; command level b corresponds to a requested increase in wireless terminal transmission power level by $P_b$; Command level −a corresponds to a requested decrease in wireless terminal transmission power level by $P_a$, command level −b corresponds to a requested decrease in wireless terminal transmission power level by $P_b$. The commanded value of power level adjustment, in accordance with the invention, is an analog value allowing a continuous or infinite selection of power level adjustment possibilities within ranges $[-P_b, -P_a]$, $[P_a, P_b]$ as opposed to a digital scheme with fixed levels of adjustments, or step size adjustments, based on the number of bits used to convey the information.

The multilevel option power control, of the present invention, of: (1) no change, (2) a continuous (analog) increase range, and (3) a continuous (analog) decrease range has distinct advantages over known systems that employ only two options: increase or decrease. In those known two option systems, in many cases, the 0 power control is achieved over time, by toggling back and forth between + and − control commands, e.g. +−+−+− . . . so that changes cancel each other out over time. This effect of toggling is wasteful in terms of unnecessary power level adjustments being made by the wireless terminal and in terms of unnecessary power control signaling. The unnecessary signaling results in additional signal processing, requires additional air link resources, and results in higher levels of interference throughout the system than are necessary as compared to the system of the present invention where the absence of a power control signal is treated as a command to leave the power level unchanged. In the multi-level power control implementation, in accordance with a feature of the invention, the base station remains quiet and does not transmit a power control command signal on its respective signal component, e.g. when no change in transmission power level is desired for a wireless terminal. This feature of the invention of not transmitting power control commands, when no change in transmission power level is desired, reduces the level of interference in the system, frees up additional air link resources, e.g., bandwidth over time, reduces the amount of signal processing required, and reduces the wireless terminals power expenditure by not having to make unnecessary toggling adjustments as compared to some known systems.

In accordance with the invention, the values of a, b and the models used to define the regions [−b,−a], [a,b] are known to both the base station and the wireless terminals. The values a, b may be different for different wireless terminals in the system. Having different power control ranges for different distinct wireless terminals or types of wireless terminals increases the flexibility in the control scheme. In some embodiments, the values [a,b] may be adjusted or updated at fixed or non-fixed intervals and/or frequently in order to improve power control and/or make adjustments responding to changes in levels of interference to maintain the desired level of power control signaling at a predetermined quality level without unnecessarily expending wireless terminal energy. In other embodiments the values for each wireless terminal or type of wireless terminal may remain fixed until reprogrammed, e.g., for a system update or new software release.

The method of the invention also supports use of feedback information from a wireless terminal to scale a power control signal prior to transmission by a base station. In one exemplary embodiment a control loop, which utilizes wireless terminal feedback information, e.g. feedback of downlink channel quality reports, and the knowledge of the precise power control scaling model/range limits used in the wireless terminal to rescale the power control command signal in the base station prior to signal transmission. This synchronizes power control scale factor information in the base station with scale factor information in the wireless terminal to which the command is sent. The scale factor adjustments may be performed independently for each wireless terminal. This approach of scale factor adjustment or synchronization, of the present invention, provides a tightly coupled base station to each wireless terminal power control loop, which may result in less signaling being required to maintain control, quicker wireless terminal responses with less signaling may be achieved with the use of accurate scaling. This can reduce the amount of time required to achieve power control stability following some transient condition.

In accordance with various features of the invention, power control signal hopping sequences are established for each of the base station's terminal IDs. The sequences of adjacent base station may be structured to reduce the interference in power control signals between adjacent base station by controlling adjacent base stations not to always assign the same frequencies at the same time to power control signals in adjacent cells. To limit interference of power control signaling in a sectorized embodiment, different sectors leave tones, which are used for power control in one sector, unused in an adjacent sector at a given time. Another approach used to limit interference, and potential damage to the power control signaling directed to the same wireless terminal on the same frequency is to subdivide a superslot transmission interval into multiple transmission slots, e.g., time periods. In each slot, in accordance with one embodiment of the invention, the base station transmits power control command signals for a subset of the number of base station's terminal identifiers (IDs). The subset is smaller than the full set of terminal IDs. The subset changes from slot to slot substantially increasing the power control command signal sequence repeat interval for each wireless terminal. Thus, in such an embodiment, the period of power control signaling repetition is far longer than the repetition period for tones assigned for data transmission.

Some embodiments of the invention, utilize the quadrature component of each of the power control signals to convey device (wireless terminal) identification information. The system usually supports more device identifiers than wireless terminal identifiers with device identifiers, in some embodiments being unique to a particular wireless terminal. This use of quadrature component in power control signaling provides advantages in system maintenance improving the turn-around time in the event of a disconnect or loss of communications between the base station and a wireless terminal. This is because the use of a device identifier allows a wireless terminal to distinguish between power controls intended for the particular device and another device which may have been using the same wireless terminal ID at some point in time in the cell. In one particular embodiment, each device (wireless terminal) in the system has a unique device identification sequence, that is known to the base station and the device (wireless terminal). When a device (wireless terminal) is recognized by the base station and assigned a terminal ID, with a corresponding power control command hopping sequence, the device identification sequence information is communicated using the quadrature component of the power control signals to be transmitted. This allows a wireless terminal to quickly detect a loss of connection with the base station, e.g. loss of terminal ID assignment, and the wireless terminal can promptly take appropriate action, e.g. attempt to re-access the base station. The identification sequence information also helps to prevent a wireless terminal from wrongly interpreting and applying power control commands intended for a different device (wireless terminal) thus providing a more robust and reliable power control implementation.

It should be noted that the numerous signaling features of the present invention can be used alone or in various combinations to provide a wide variety of signal methods which can be used in various types of systems depending upon the needs of the particular system. Thus, described in the context of an exemplary OFDM wireless system, for purposes of explanation, the signaling methods and apparatus of the present invention are applicable to a wide range of other communication techniques such as Code Division Multiple Access (CDMA), Time Division Multiple Access (TDMA), etc. and may be applied to a wide range other communications systems.

DETAILED DESCRIPTION

Exemplary embodiments of the invention are described below in the context of a cellular wireless data communication system. The exemplary system is a spread spectrum OFDM (orthogonal frequency division multiplexing) multiple-access system which includes features, modifications, improvements, apparatus and methods implemented in accordance with the present invention. While the exemplary OFDM wireless system is used for purposes of explaining the invention, the invention is applicable to a wide range of other communication techniques such as CDMA, TDMA, etc. and a wide range of other communications systems.

Figure 1:
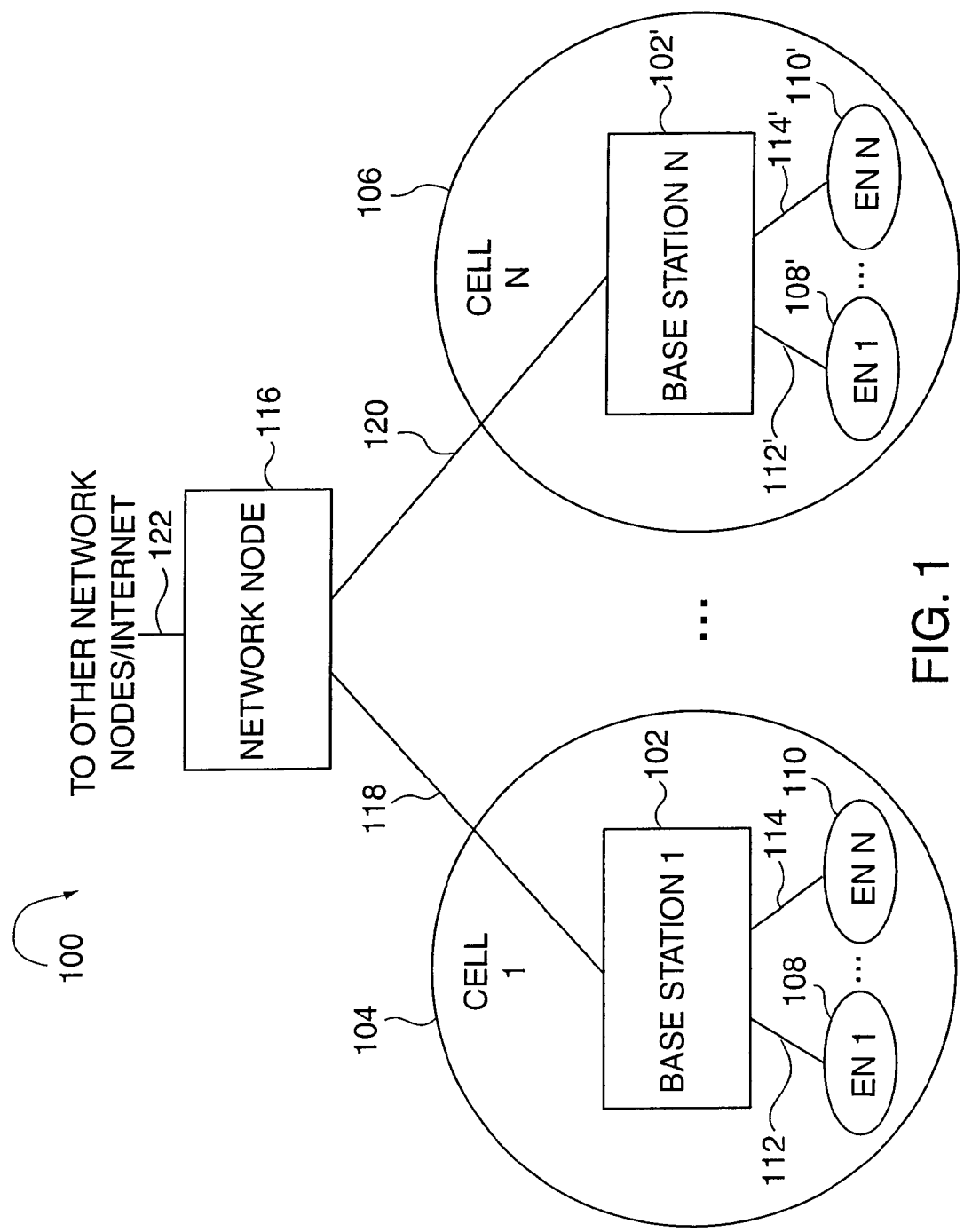
FIG. 1 illustrates an exemplary communication systems implementing the power control apparatus and methods of the present invention.

FIG. 1 illustrates an exemplary communications system 100 using apparatus and methods in accordance with the present invention. Exemplary communications system 100 includes a plurality of base stations including base station 1 (BS 1) 102 and base station N (BS N) 102'. BS 1 102 is coupled to a plurality of end nodes (ENs), EN 1 108, EN N 110 via wireless links 112, 114 respectively. Similarly, BS N 102' is coupled to a plurality of end nodes (ENs), EN 1 108', EN N 110' via wireless links 112', 114' respectively. Cell 1 104 represents the wireless coverage area in which BS 1 102 may communicate with ENs, e.g., EN 1 108. Cell N 106 represents the wireless coverage area in which BS N 102' may communicate with ENs, e.g., EN 1 108'. ENs 108, 110, 108' and 110' may move throughout the communications system 100. The base stations BS 1 102, BS N 102' are coupled to a network node 116 via network links 118, 120, respectively. The network node 116 is coupled to other network nodes, e.g., other base station, routers, home agent node, Authentication Authorization Accounting (AAA) server nodes, etc., and the Internet via network link 122. Network links 118, 120, 122 may be, e.g., fiber optic cables. Network link 122 provides an interface outside the communications system 100, allowing users, e.g. ENs, to communicate with nodes outside system 100.

Figure 2:
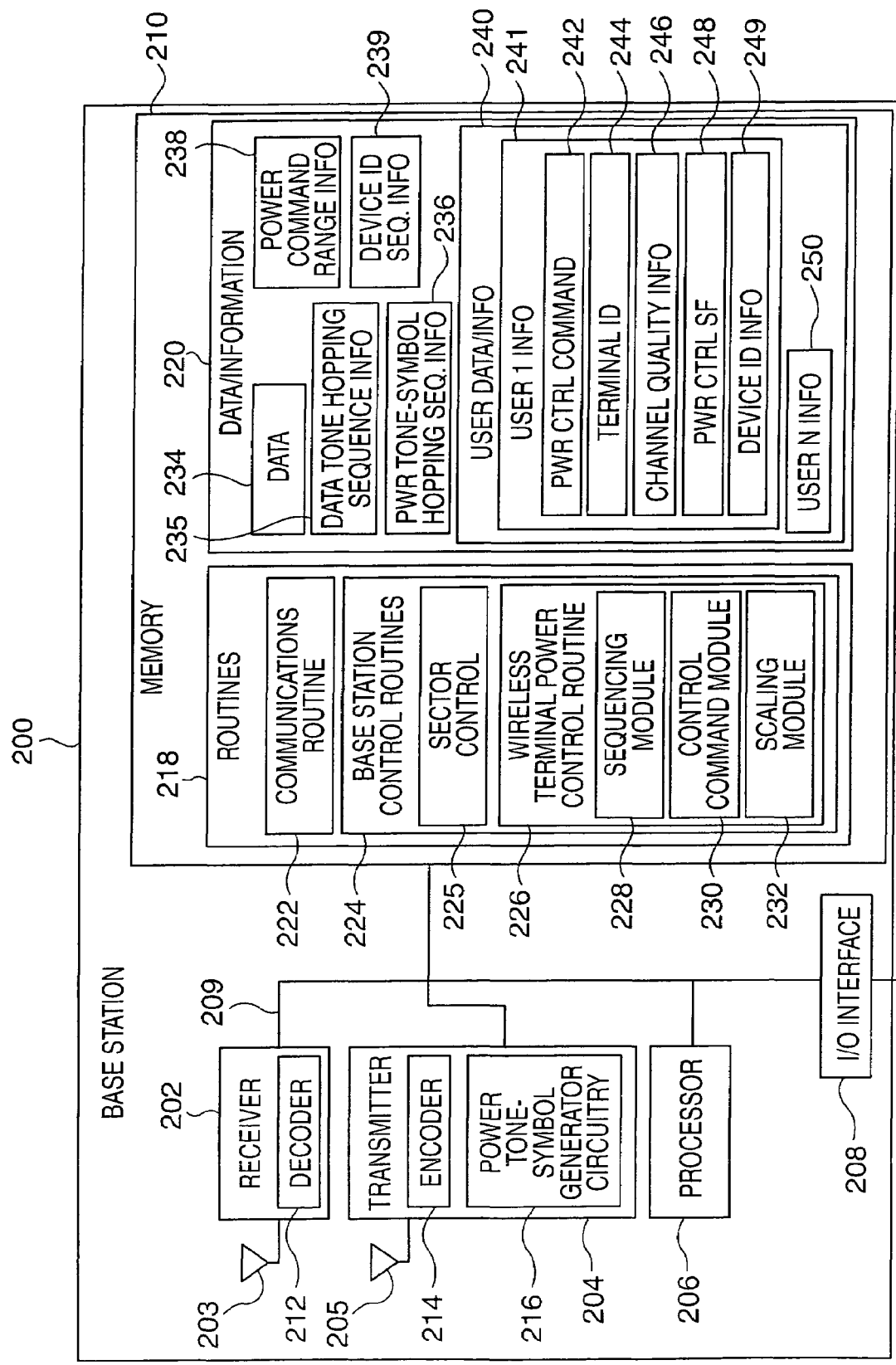
FIG. 2 illustrates an exemplary base station implemented in accordance with the present invention.

FIG. 2 illustrates an exemplary base station 200 in accordance with the present invention. Exemplary base station 200 may be a more detailed representation of base stations 102, 102' of FIG. 1. Exemplary base station 200 includes a receiver 202, a transmitter 204, a processor 206, e.g., CPU, an I/O interface 208 and memory 210 coupled together via a bus 209. The various elements 202, 204, 206, 208, and 210 may exchange data and information over bus 209.

The receiver 202 and the transmitter 204 are coupled to antennas 203, 205, respectively, providing a way for the base station 200 to communicate, e.g. interchange data and information, with end nodes, e.g. wireless terminals, within its cellular coverage area. The receiver 202, including a decoder 212, receives and decodes signaling, which had been encoded and transmitted by end nodes operating within its cell. The transmitter 204 includes an encoder 214, which encodes signaling prior to transmission, and power tone-symbol generator circuitry 216. The power-tone symbol generator circuitry 216 generates control signals referred to herein as power tone-symbols. The power-tone symbols are generated with appropriate analog levels, at the appropriate tone frequency, at the appropriate symbol time, for each of the end nodes, e.g., wireless terminals being serviced by the base station 200 in accordance with the present invention. Generation of a power tone-symbol involves mapping of power control information on a single tone. The power-tone signal is then transmitted during a single OFDM symbol transmission time period.

The memory 218 includes routines 218 and data/information 220. The processor 206 controls the operation of the base station 200 by executing routines 218 and utilizing data/information 220 in memory 210 to operate the receiver 202, the transmitter 204, and the I/O interface 208, to perform the processing controlling basic base station functionality, and to control and implement the new features and improvements of the present invention including power control of the wireless terminals being serviced. I/O interface 208 provides base station 200 with an interface to the Internet and other network nodes, e.g. intermediate network nodes, routers, AAA server nodes, home agent nodes, etc., thus allowing end nodes communicating through wireless links with base station 200 to connect, communicate, and interchange data and information with other peer nodes, e.g., another end node, throughout the communication system and external to the communication system, e.g., via the Internet.

Routines 218 include communications routines 222, and base station control routines 224. The base station control routines 224 includes a sector control routine 225 and a wireless terminal power control routine 226. In various sectorized embodiments, the sector control routine 225 controls tone use in individual sectors. In some cases the same set of tones is used in each sector but, to avoid conflicts with some power control signals tones used in adjacent sectors are controlled so that a tone used for power control signaling will not be used in the adjacent sector at the same time. Thus, sector control 225 can control some tones to go unused in some sectors at particular times. The control signal features of the invention can be used in both sectorized and non-sectorized cells. The wireless terminal power control routine 226 includes a sequencing module 228, a control command module 230, and a scaling module 232. The data/information 220 includes data 234, power tone-symbol hopping sequencing information 236, power command range information 238, device ID sequence information 239, and user data/info 240. Data tone hoping sequence information 235 is also included in memory 210. In various embodiments of the present invention data tone hopping sequences have a period shorter than the period of the power control signaling hopping sequences used for various wireless terminals. Thus the periodicity of the data tone hopping sequence is shorter in some implementations than the power control signal tone hopping sequence. The user data/info 240 includes a plurality of user information, user 1 information 241, and user n information 250. Each user information, e.g., user 1 info 241, includes power control command information 242, terminal Identification (ID) 244, channel quality information 246, power control scale factor information 248, and device identification information 249.

Data 234 may include received data from end nodes and data to be transmitted to end nodes. Power tone-symbol sequencing information 236 may include a specified set of tones that may be used as power control tone-symbols, a set of power tone-symbol hopping sequences or information from which those sequences may be derived, each sequence specific to the base station 200 and correlating a terminal identifier (ID) 244 with specific tone assignments at a specific symbol times within the sequence. In some embodiments, one terminal identifier ID is used for each of N wireless terminals which can interact with the base station at a point in time. Upon entering a cell a wireless terminal, e.g., end node is assigned a terminal ID. Thus terminal IDs are reused as wireless terminals enter and leave a cell. Device IDs which are device specific are normally unique to a device in a system and will remain the same as a wireless terminal moves from cell to cell. Power tone-symbol sequencing information 236 may also include a slot time, e.g. a specified number of consecutive symbol times, a specified number of base station terminal IDs 344 that may receive a power control command tone-symbol during a slot, e.g. a subset of the total number of base station terminal IDs 344, a number of slots, and a super-slot time, e.g. one set of slots. Power control range information 238 may include values which may be correlated to upper and lower range limits for the wireless terminal power control commands, used to command increases or decreases in wireless terminal transmission power. For example, a different power control range can be used for wireless terminals near the base station than is used for wireless terminals far from the base station. In some embodiments, the power command range information 238 may be different for unique wireless terminals or different groups, types or classifications of wireless terminals. In some embodiments, the power command range information 238 may be fixed values, known to the base station 200 and wireless terminals, and which remain unchanged for relatively long intervals, e.g., until the base station 200 and wireless terminal are reprogrammed. In other embodiments, the range values may be adjusted by the base station 200 at periodic or non-periodic intervals by the base station 200, and the new range value information 238 transferred to the wireless terminals. Device identification sequence information 239 may include a plurality of sequences or information to derive the sequence, each sequence unique to a specific device, e.g. wireless terminal, and each sequence associated with a device ID 249, e.g., an IP address. In some embodiments, device ID sequence information 239 may be transmitted one of the in-phase and quadrature components of the power command tone-symbol for improved authentication of power control commands between the base station 200 and the wireless terminals.

Power control command information 242 includes the power control wireless terminal transmission level adjustments, calculated by the base station 200, for each of the wireless terminals being serviced. Each base station has a set of terminal identifiers (terminal IDs) 244 assigned to users, e.g. wireless terminals that are being serviced. Each terminal ID 244 may be associated with a different power tone-symbol hopping sequence of info 236. Channel quality information 246 may include a channel quality report from the user including feedback power information and downlink channel quality reports from the wireless terminals. The feedback information may be stored for a plurality of past transmissions. The power control scale factor 248 may be the calculated gain adjustment, based on past feedback information, that should be applied to the power control command 242 before transmission to more accurately control the wireless terminal's transmission power level. Device ID information 249 may be a wireless terminal identifier, e.g. an association with an IP address, unique to each wireless terminal, allowing the base station 200 to select the specific corresponding device ID sequence from info 239. Device ID info 249 is normally unique to a wireless terminal and is not base station dependent.

Communications routines 222 includes various communications applications which may be used to provide particular services, e.g., IP telephony services, text services and/or interactive gaming, to one or more users end nodes in the system. Base station control routines 224 perform functions including basic control of the signal generation and reception, control of data and pilot hopping sequences, control of encoder 212 and decoder 214, scheduling, allocation of bandwidth to users, scheduling users to terminal IDs 244, and control of the output transmission power from the base station 200.

Wireless terminal power control routine 226, also included in base station control routines 224, may perform power control for each of the wireless terminals being serviced by the base station 200 including closed loop control of wireless terminal transmission power levels using analog power control commands, e.g., analog power control signals, generated and transmitted to the wireless terminals.

The sequencing module 228 controls the operation of the base station's power control tone-symbol sequences using data/info 220 including the power tone-symbol sequencing information 236 and terminal IDs 244 in accordance with the present invention. Sequencing module 228 directs which tone frequencies should be transmitted during specific symbol times, for specific terminal IDs 244 in order to transmit power control commands to the wireless terminals. In some embodiments, sequencing module 228 also uses the device ID sequence information 239, and the device ID 249 to generate device unique sequence information to accompany the power control commands 242 in the power tone-symbols.

The control command module 230 generates power control commands 242, e.g., wireless terminal transmission power level adjustment commands, for each of the users being serviced by the base station using the data/info 220 including the power command range information 238, terminal ID 244, device ID 249, and channel quality information 246, e.g., past feedback power data and/or downlink channel quality reports from wireless terminal.

The scaling module 232 calculates a current power control scale factor 248 for each user being serviced by the base station 200. The calculation may performed as a function of information such as feedback power information and/or downlink channel quality reports, over a plurality of past transmissions, past transmissions of power control commands 242, knowledge of the wireless terminals operational power control model and anticipated response to past commands. Scaling module 232 also uses data/info 220 including input such as power control command 242 and the power control scale factor 248 to scale or update the power control command 242. The updated power control command 242 is sent to the power tone-symbol generator circuitry 216 for generation of a rescaled analog power tone symbol signal command level prior to transmission to the intended wireless terminal.

Figure 3:
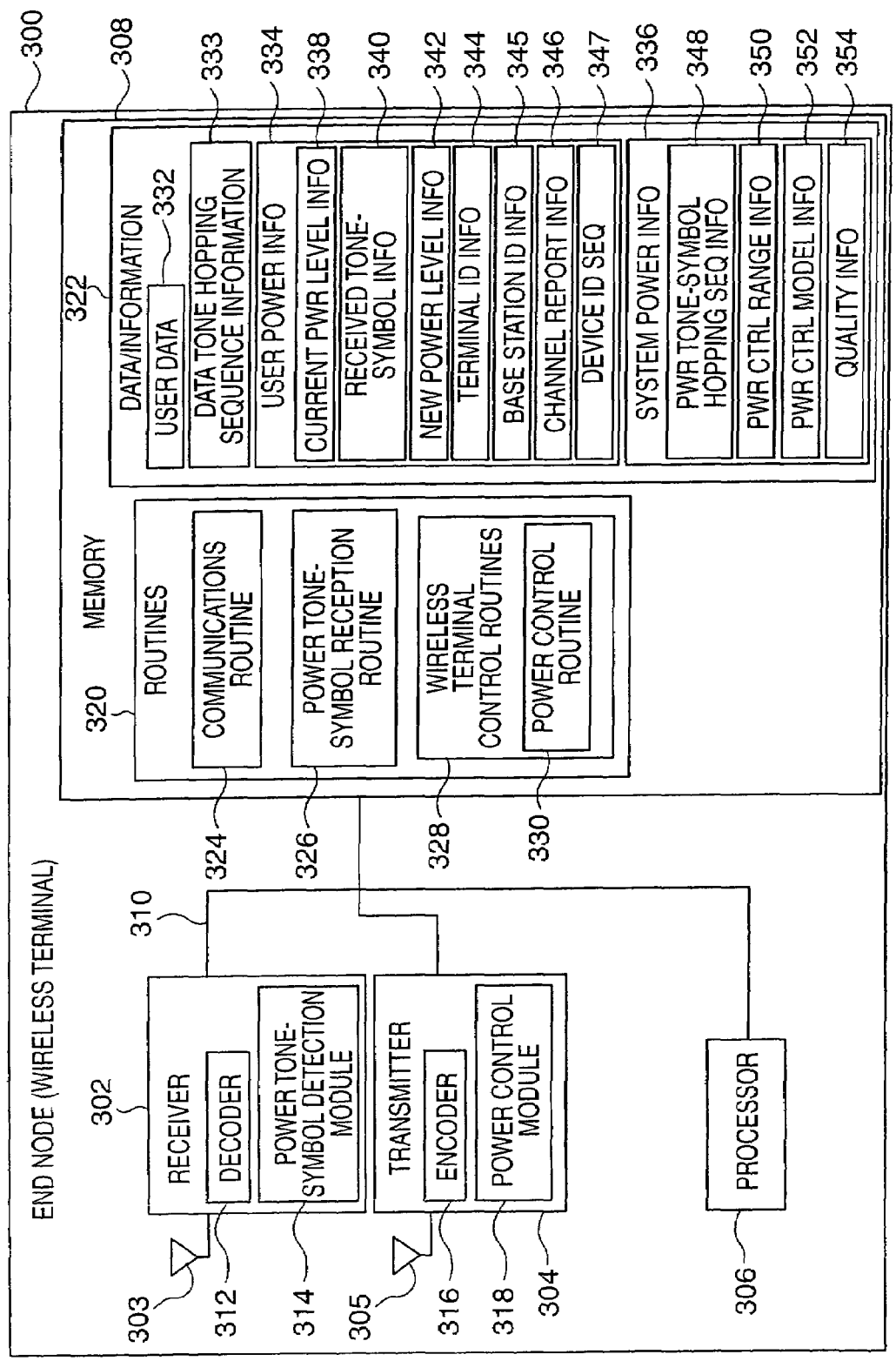
FIG. 3 illustrates an exemplary end node, e.g., wireless terminal, implemented in accordance with the present invention.

FIG. 3 illustrates an exemplary end node 300 in accordance with the present invention. Exemplary end node 300 may be used in any of the end nodes 108, 110, 108', 110' of FIG. 1. Exemplary end node 300, e.g., wireless terminal, may be a mobile terminal, mobile, mobile node, fixed wireless device, etc. In this application, references to end node 300 may be interpreted as corresponding to any one of a wireless terminal, mobile node, etc. Wireless terminals may be mobile nodes or stationary devices which support wireless communications links. Exemplary end node 300 includes a receiver 302, a transmitter 304, a processor 306, e.g. CPU, and memory 308 coupled together via a bus 310. The various elements 302, 304, 306, 308 may exchange data and information over bus 310.

The receiver 302 and the transmitter 304 are coupled to antennas 303, 305, respectively which provides a way for the end node 300 to communicate with the base station 200 via wireless links. The receiver 302 including a decoder 312 and a power tone-symbol detection circuit 314. The receiver 302 receives and decodes signaling, e.g. data transmissions, which were encoded and transmitted by a base station 200. The receiver 302 also receives and detects analog power-tone symbols using power tone-symbol detection circuitry 314 in accordance with the invention. The transmitter 304 includes an encoder 316, which encodes signaling prior to transmission, and power control module 318 which adjusts the transmitter's power level in response to control commands in accordance with the invention.

The memory 308 includes routines 320 and data/information 322. The processor 306 controls the operation of the end node 300 by executing routines 320 and utilizing data/information 322 in memory 308 to operate the receiver 302 and the transmitter 304, to perform the processing controlling basic wireless terminal functionality, and to control and implement the new features and improvements of the present invention including detecting, evaluating, and applying power control commands directed to the wireless terminal's transmission power levels.

Routines 320 include communications routines 324, power tone-symbol reception routine 326 and wireless terminal control routines 328. The wireless terminal control routines 328 includes a power control routine 330. The data/ information 322 includes user data 332, user power information 334, and system power information 336. User power information 334 includes current power level information 338, received tone symbol information 340, new power level information 342, terminal ID info 344, base station ID information 345, channel report information 346, an a device identification sequence 347. System power information 336 includes power tone-symbol hopping sequence information 348, power control range information 350, power control model information 352, and quality information 354. Data/Information block 322 also includes data tone hopping sequence information 333. In various embodiments the periodicity of the data tone hopping sequence or sequences which are used are shorter than the power control tone hopping sequence used.

User data 332 may include data to be transmitted to the base station 200 and data received from base station 200. User current power level information 338 may include the current or most recent level of transmission power, and status of the battery power level. Received power tone-symbol information 340 may include the information included in the last power tone-symbol transmission from the base station 200 including a power control command value and, in some embodiments, a quality value or a device ID sequence value. New power level information 342 may include a new transmit power assignment value based upon the power control command from the base station. Terminal ID information 344 is a base station assigned ID. Base station ID information 345 includes information, e.g. a slope value, that may be used to identify a specific base station to which the wireless terminal 300 is connected. Base station ID information 345 and terminal ID info 344 may be used by the wireless terminal 300 to obtain the designated power control tone-symbol sequence of info 348 for the terminal ID 344 assigned to the wireless terminal 300 by the specific base station 200. Channel report information 346 may include power information feedback to the base station including information from detected pilots, downlink channel quality reports, interference levels, command level detected, etc. Power tone-symbol sequence information may include a plurality of specific power tone-symbol hopping sequences, or information 348 used to derive the sequences, associated with the different terminal IDs 344 for different base station IDs 345. Power control range information 350 may include values defining upper and lower limits in the base station's transmitted power control increase/decrease command tone-symbol. The wireless terminal's power control range value information 350 should match the base station's power command range information 238 for a specific wireless terminal 300. Power control model information 352 may include information such as look up tables, modeling the power control equation, to allow the wireless terminal 300 to interpolate the received real power control command value between the limits in the power control range information 350. Quality information 354 may include criteria to apply to quality information included in received power tone-symbol info 340. In one embodiment, the quality information 354 may include a level, which when exceeded results in rejection of the power control command, but when not exceeded results in acceptance of the power control command. In other embodiments, the quality information 354 criteria may include a first threshold level, that when exceeded results in the wireless terminal 300 rejecting and discarding the power control command, a second threshold level, that when not exceeded results in the wireless terminal accepting and using the full power control command, and an intermediate region between the first and second levels where a percentage of the received power control command may be applied.

Communications routines 324 includes various communications applications which may be used to provide particular services, e.g., IP telephony services, text services and/or interactive gaming, to one or more end node users.

Power tone-symbol reception routine 326 controls the power tone-symbol detection module 314 using data/information 322 including power tone-symbol hopping sequence information 348, base station ID 345, assigned terminal ID 344 to receive and detect the tone-symbols that have been assigned by the base station 200 for power control for wireless terminal 300. Detection circuitry 314 under control of reception routine 326 separates command information from quality information/device ID sequence information included in the components of the power-tone symbol received 340. Reception routine 326 may process the received tone-symbol information 340. Processing by reception routine 326 may include checking the command level portion (I or Q component) of received power tone-symbol 340 against the acceptable range info 350, and comparing the quality portion (the other one of the I and Q component) of the received power tone-symbol 340 against limits in the system quality info 354. Based on the results of these evaluations, routine 326 may issue a quality evaluation into channel report information 346. In some embodiments, reception routine 326 may also check the received power tone-symbol information 348 against a known expected value in the device identification sequence 347 to authenticate communication between the base station 200 and the wireless terminal 300.

Wireless terminal control routines 328 control the basic functionality of the wireless terminal 300 including the operation of the transmitter 304 and receiver 302, signal generation and reception including data/control hopping sequences, state control, and power control.

Power Control routine 330 may use the data/information 322 including the channel report info 346 and current power level info 338, e.g. battery condition, to decide what action to perform: ignore the received power control command, e.g. suspect transmission was corrupted by interference, apply a fraction of the command, e.g., in the case of a marginal quality level, or apply full command level, e.g. in the case where the quality level is determined to be very high because very low interference is detected. A decision to ignore a received power control signal may be made by power control routine 330 when the I and Q signal portion of a received control signal which is not used to transmit the control information include power above a preselected level which is used to detect a particular level of noise, e.g., a level indicative of an unreliable signal. A received power level of zero in a power control signal indicates that the transmission power level used by the wireless device 300 should be changed by zero, e.g., no change is required. If the power control routine 330 decides not to change the power level, the current transmission power level in information 338 is directed to the power control circuitry. If the power control routine 330 decides to change the transmission power, the data/information 322 including current transmission power level in info 338, received tone symbol power command in info 340, power control range info 350, and power control model info 352 is used to calculate a new transmission power level 342 which the power control circuitry 318 is directed to use.

Figure 4:
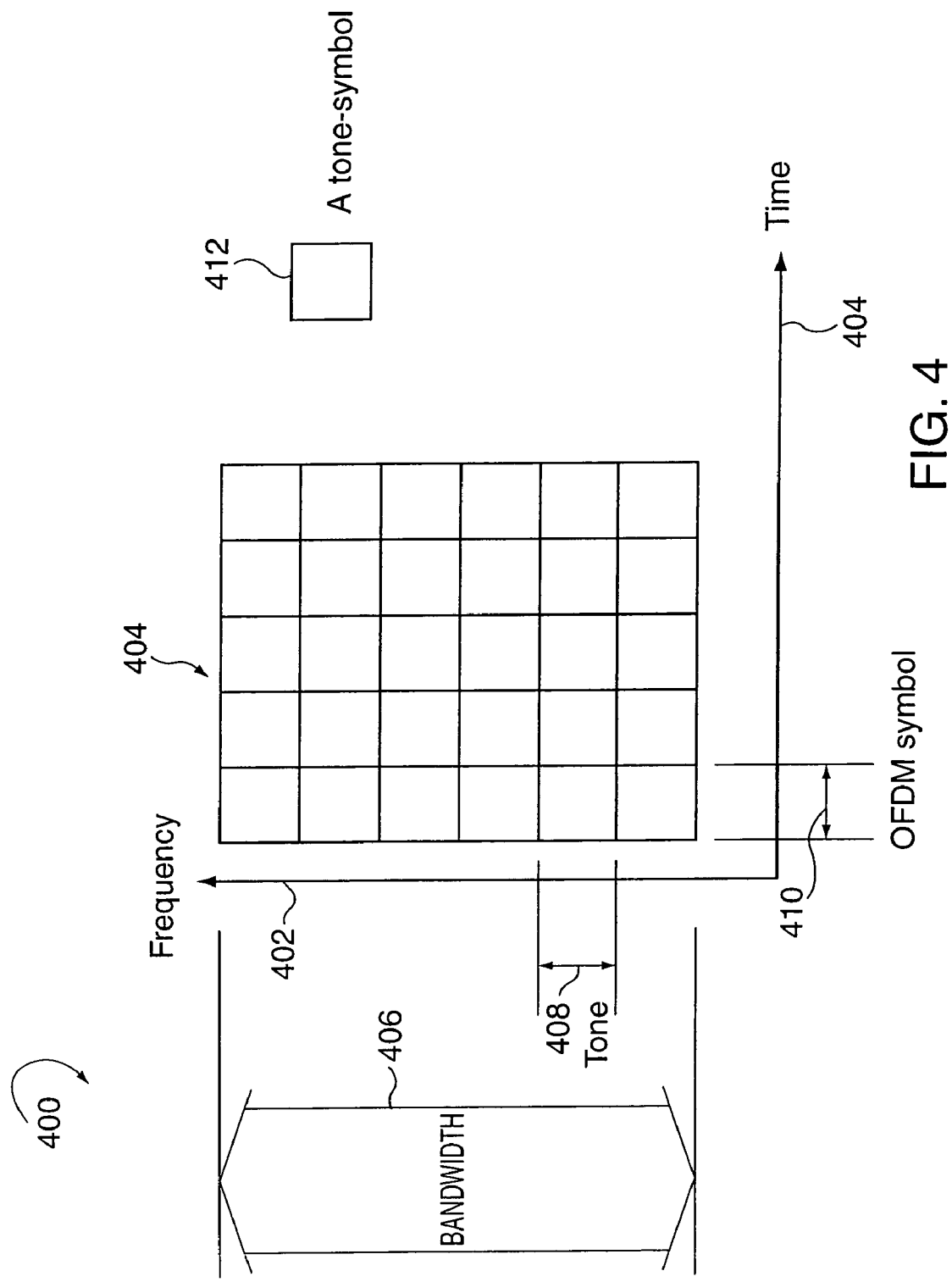
FIG. 4 illustrates exemplary air link resources in an exemplary OFDM system.

FIG. 4 shows a graph 400 of frequency on the vertical axis 402 vs time on the horizontal axis 404 for an exemplary OFDM system. Air link resource 404, e.g. communication bandwidth over time, in the exemplary OFDM system, is shown on the graph 400 as a grid of boxes, six rows by 5 columns. In the exemplary OFDM system, the available bandwidth 406 in the frequency domain is divided into a number of orthogonal tones 408. The time domain is divided into a number of OFDM symbol periods 410. At any OFDM symbol period, any of the six tones 408 can be used to transmit a complex number representing the information to be communicated. The basic unit of the air link resource 404 is a tone 408 at an OFDM symbol period 410, which is called a tone-symbol 412 in this application, and is represented by a square grid box 412. FIG. 1 shows 30 tone-symbols in total or 6 tone-symbols in each of the 5 OFDM symbol periods of the air link resource 404.

In the exemplary OFDM system the base station may transmit tone-symbols to wireless terminals located within the base station's cellular coverage area or cell. In accordance with the invention, each power control command is transmitted by the base station to a wireless terminal using a single tone-symbol. In general, a complex number is transmitted with each tone-symbol. A complex number includes two components: an in-phase component and a quadrature component. In the description in this application, the uses assigned to the in-phase and quadrature components of the tone-symbol may be interchanged. The information conveyed in two components, in-phase and quadrature could also be conveyed in two orthogonal components offset by a predetermined and known amount from the in-phase component.

Figure 5:
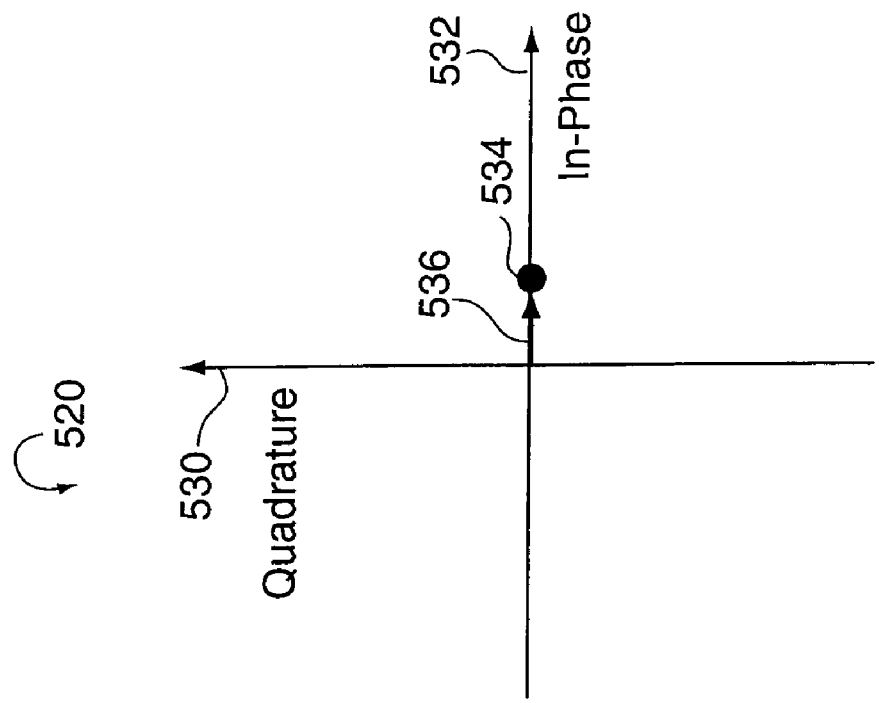
FIG. 5 illustrates two exemplary power control tone-symbol embodiments in accordance with the present invention.
Figure 5:
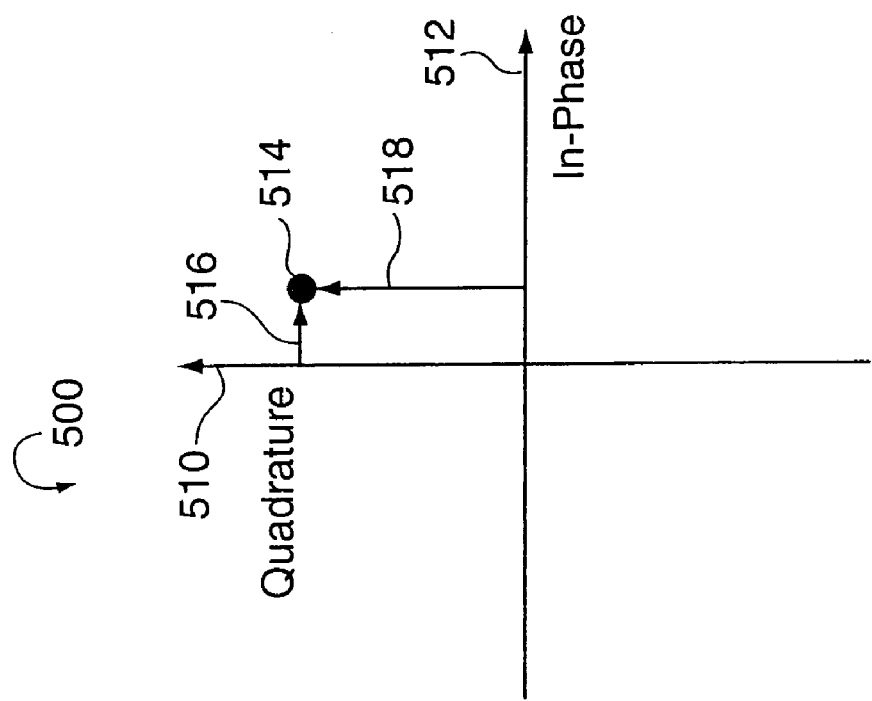

In graph 500 of FIG. 5, the vertical axis 510 represents quadrature 510 and the horizontal axis 512 represents in-phase. In graph 500, exemplary tone-symbol 514 includes an in-phase component 516 and a quadrature component 518. In the exemplary embodiment of graph 500, two power control commands are transmitted using a single tone-symbol 514, where the first power control command is transmitted in the in-phase component 516 and may be used as a power control command for a first wireless terminal, wireless terminal #1, and the second power control command is transmitted in the quadrature component 518 and may be used for a second wireless terminal, wireless terminal #2.

In another embodiment, power control commands intended for different wireless terminals are transmitted independently. In such an embodiment, only one power control command for one wireless terminal is transmitted in a single tone-symbol. Graph 520 of FIG. 5 illustrates such an embodiment. In graph 520 of FIG. 5, the vertical axis 530 represents quadrature and the horizontal axis 532 represents in-phase. In graph 520, exemplary tone-symbol 534 includes an in-phase component 536 and no or zero quadrature component. In this case, the power control command is transmitted in the in-phase component 536 and the quadrature component can be left unused in transmission, e.g., no power is transmitted by the base station in the quadrature component. Expected unused, i.e., no transmission of, quadrature component in a power control tone-symbol can help to improve the signaling robustness by making it easy to detect interference. The wireless terminal can evaluate the quadrature component of the received tone-symbol 534 to determine the reliability of the received power control command in in-phase component 536. In the cellular environment, the tone-symbols, including the tone-symbol carrying the power control command are subject to interference, e.g., from adjacent base stations. Suppose that the wireless terminal detects a significant amount of energy in the quadrature component of the power control tone-symbol, while there should be no signal component in the quadrature component because the base stations transmits power control tone-symbols with zero quadrature. In such a case, the high signal level in the quadrature component is a good indication to the wireless terminal that a strong interferer has corrupted the power tone-symbol, and therefore the wireless terminal should, and in some embodiments does, discount the significance of the power control command and/or discard the command.

In other embodiments, a single power control command for one wireless terminal is transmitted in the in-phase component of a single power control tone-symbol and a predefined signal level, e.g., a very low level, is transmitted is in the quadrature component of the signal, where the detected level of the received quadrature component is used by the wireless terminal to determine the level of interference on the power control command signal in the in-phase component, and take actions including use fully, use partially or in a weighted manner, or reject.

In other embodiments, a single power control command for one wireless terminal is transmitted in the in-phase component of a single power control tone-symbol, and no signal is transmitted by the base station in the quadrature component and the wireless terminal does not evaluate the quadrature signal.

In still other embodiments, a single power control command for one wireless terminal is transmitted in the in-phase component of a single power control tone-symbol, and a different function or use, e.g. wireless terminal identity sequence information, is assigned to the information transmitted in the quadrature component.

In accordance with the invention, in some embodiments, if the base station does not intend to adjust the transmission power of the wireless terminal, then the base station does not send the corresponding power control command. This approach of the base station keeping quiet, with respect to power control commands, when it does not want to change a wireless terminal's transmission power level is more efficient and creates less interference than many typical known power control implementations. In many typical known power control implementations, power control signals are sent as a sequence of + or − command signals, and in order to achieve a zero net effect the command signals are alternated, e.g. +_+−_−+−. This known and widely used method of toggling power control signals is inefficient, as it may cause the wireless terminal to unnecessarily make adjustments and expend power, and has the additional undesired side effect of generating additional interference, due to the base stations transmission of the toggling power control signals. In contrast, the approach of the present invention, saves wireless terminal power by not commanding the wireless terminals to make unnecessary adjustments and has the added benefit of lower levels of interference from reduced base station power control signaling.

For example, in the case where two power control commands share a tone-symbol, e.g., as in graph 500, if the first power control command, to wireless terminal #1, is not intended to be sent, and the second power control command to wireless terminal #2 is intended to be sent, the in-phase component 516 is set to zero, while the quadrature component 518 can be set to an appropriate nonzero value. If the base station does not intend to send power control commands for either wireless terminal #1 or wireless terminal #2, then both the in-phase component 516 and the quadrature component 518 would be zero, and the tone-symbol 514 is not sent. In some exemplary embodiments where one power control command, for one wireless terminal, occupies a tone-symbol, if the power control command is not intended by the base station to be sent, then the in-phase component is not sent, and, furthermore, if no quadrate component is transmitted or the quadrature component is unused, the entire complex number is not transmitted in that tone-symbol.

Figure 6:
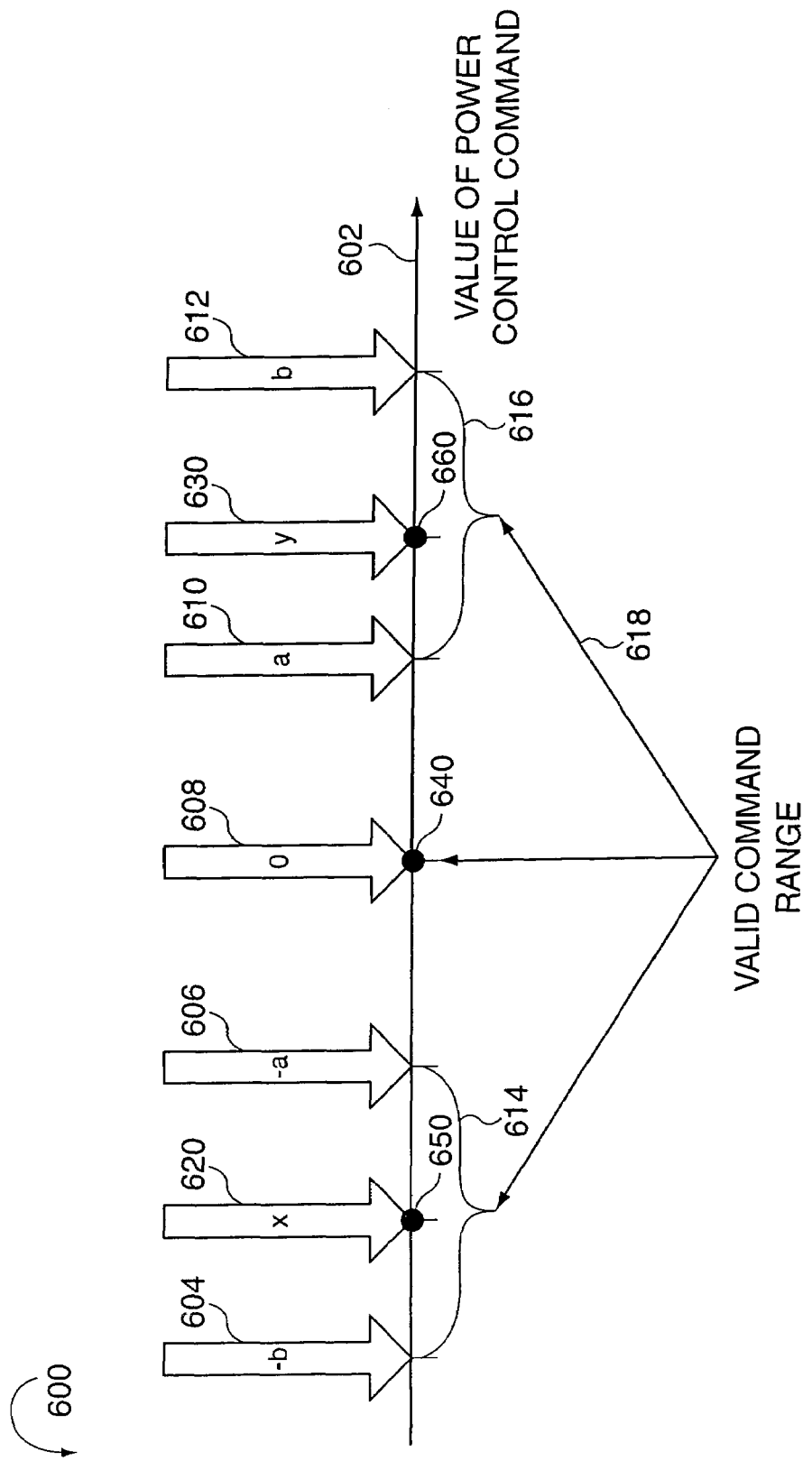
FIG. 6 illustrates exemplary use of analog signaling of power control commands in accordance with the present invention.

FIG. 6 600 illustrates exemplary use of analog signaling of power control commands in accordance with the invention. The horizontal axis 602 represents values of power control command from the base station to the wireless terminal. Along the power control command axis 602, values −b 604, −a 606, zero 608, a 610, and b 612 are shown. Intervals of [−b, −a] 614 and [a, b] 616 are shown and indicated by braces below axis 602. In accordance with the invention, a power control command can be zero 608, indicating that the base station does not intend to adjust the transmission power of the wireless terminal. Dot 640 represents a zero command. If the power control command is nonzero, the value of the power control command transmitted in the in-phase or quadrature component can be in the interval of [−b, −a] 614 or [a, b] 616, where b>a>0. Three headed arrow 618 points to the three acceptable inputs of power control commands that the base station may choose: zero (0) 608, interval [−b, −a] 614 or interval [a, b] 616. If the value is +a 610, then the power control command instructs the wireless terminal to increase the transmission power by $P_a$. If the value is −a 606, then the power control command instructs the wireless terminal to decrease the transmission power by $P_a$. If the value is +b 612, then the power control command instructs the wireless terminal to increase the transmission power by $P_b$. If the value is −b 604, then the power control command instructs the wireless terminal to decrease the transmission power by $P_b$. If the value, e.g., an exemplary value, x 620, is between –b 604 and –a 606 in interval [–b, –a] 614, then the power control command, represented by dot 650, instructs the wireless terminal to decrease the transmission power by an amount $P_x$, where $P_x$ is a amount between $P_a$ and $P_b$ and where $P_x$ is a function of x. In one embodiment, $P_x = P_a + (P_a - P_b)*(x+a)/(b-a)$. If the value, e.g., an exemplary value, y 630, is between a 610 and b 612 in interval [a, b] 616, then the power control command, represented by dot 660 instructs the wireless terminal to increase the transmission power by an amount $P_y$, where $P_y$ is an amount between $P_a$ and $P_b$ and where $P_y$ is a function of y. In one embodiment, $P_y = P_a + (P_b - P_a)*(y-a)/(b-a)$.

In the extreme case where b=a, the power control command may instruct the wireless terminal to perform no change in power, increase the transmission power by a level $P_a = P_b$ or decrease the transmission power by a level $P_a = P_b$.

The power control command, various embodiments the invention, is a real number providing an infinite number of choices and a continuous power control selection capability. In other embodiments a limited number of power adjustments may be supported, e.g., three or more. This method of an analog control command signal level, in accordance with the invention, provides a very efficient and flexible method of precisely selecting and quickly conveying the appropriate power level adjustment to each wireless terminal, thus reducing the number of power adjustment command signals and allowing stability to be achieved more quickly. This is in contrast to the typical transmission of a digital level for the power control command signal, which may be less efficient, provide less resolution of choice, require more signaling and require more time to stabilize. If a digital command uses a single bit for control with fixed resolution, a plurality of commands is generally required in order to cause the wireless terminal to approach the correct power level and generally requires more time to stabilize and creates more signaling interference. If a digital command using multiple bits is used, the fixed number of bits allocated to the power control command message create a fixed number of possible levels of power control changes, and as one increases the number of bits allocated to power control to provide more resolution, the bandwidth utilized for power control signaling increases. The analog signaling technique of the invention allows for multiple levels of commands to be supported without the need for additional bandwidth due to the large number of possible commands.

Figure 7:
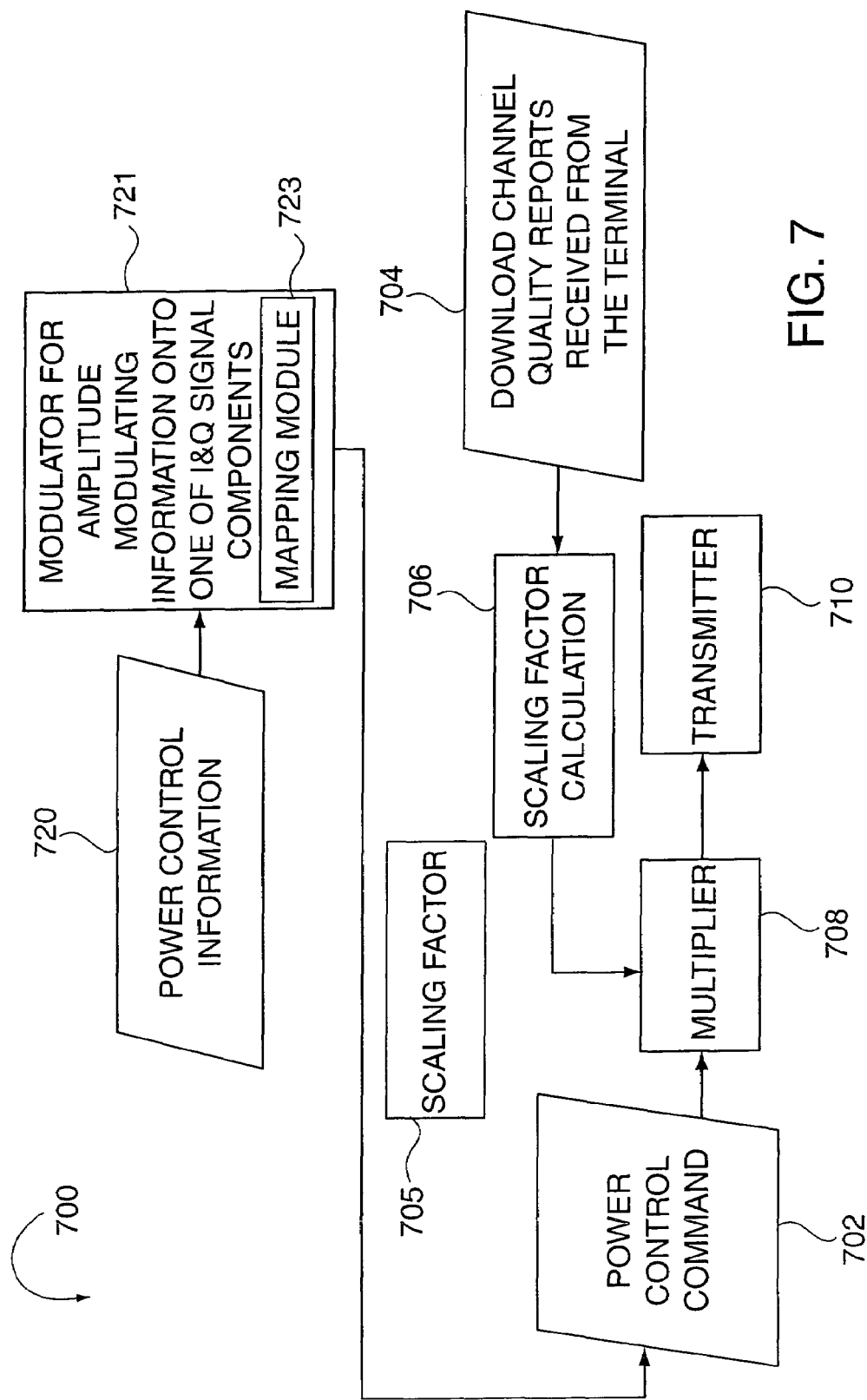
FIG. 7 illustrates pre-transmission scaling of power control commands based on feedback information in accordance with the invention.

FIG. 7, block diagram 700 shows how power control information is processed to generate a power control command 702 (242 of FIG. 2) is scaled before it is actually transmitted over the air. In FIG. 7, power control information 720 is first modulated onto a one of an I or Q signal component of a single tone to generate a power control command 702. The modulation operation is performed by an amplitude modulator 721. The amplitude modulator 721 includes a mapping module 723 that maps power control information values to at least one of three amplitude levels. In various embodiments, a power control information value indicating no change in transmission power level is mapped to a power level of zero. The power control command generated by the modulator 721 is subject to scaling in various embodiments prior to transmission. The scale factor calculation is performed in module 706, of the base station's scaling routine (232 of FIG. 2) using information from the downlink channel quality report received from the wireless terminal 704 included in user channel quality information (246 of FIG. 2). In various embodiments, the scale factor is increased in response to a decrease in channel quality and decreased in response to a reported improvement in channel quality. The scale factor 705, generated by the calculation circuit 706, is supplied as an input to multiplier module 708. Multiplier module 708 of the base station scaling routine (232 of FIG. 2) multiplies the power control command 702 by the power control scale factor 705 (248 of FIG. 2), and adjusts the signal sent to the power tone-symbol generator circuitry (216 of FIG. 2) in the transmitter 710 (204 of FIG. 2). In general the scaling factor 705 varies over time. Different scaling factors 248 are used for different wireless terminals. In general, the determination of the scaling factors 705 is carried out independently from one wireless terminal to another. In one embodiment where each of the wireless terminals frequently reports to the base station the corresponding downlink channel quality, the scaling factor is a function of the past downlink channel quality reports. For example, if the downlink channel quality decreases (or increases), then the scaling factor is increased (or decreased). Scaling is, in accordance with the invention, is increased in the base station in response to information indicating a decrease in downlink channel quality.

Consider the following simplified example used to demonstrate the benefit of scale factor synchronization between the base station and the wireless terminal, in accordance with the present invention, in achieving a more efficient and faster responding power control. Referring to FIG. 6, assume that the value of a (610)=5 and corresponds to a 0 W power increase command and the value of b (612)=10 corresponds to a 5 W power increase command, the control model is linear in range [a,b] (616), and the base station decides that the power transmission level of a wireless terminal should be increased by 5 W, sets y (630)=10, and sends a power control command to the wireless terminal. However, the wireless terminal interprets the signal as y (630)=8 due to factors, such as, e.g., channel loss, gain offsets in the wireless terminal, etc., and increases transmission power by 3 W. The base station may measure the received signal strength from the wireless terminal and issue a second command y(630)=7 for increasing the transmission signal strength by 2 W, but the wireless terminal interprets the signal as y(630)=5.6 will actually only increase the power by 1.6 W. Eventually the wireless terminal power level will converge on the desired level. However, the ranges [–b, a] and [a,b] are not as desired by the base station limiting control capability and performance.

Now consider the exemplary case if scale factor synchronization is used in accordance with the invention. Referring to FIG. 6, assume that the value of a (610)=5 and corresponds to a 0 W power increase command and the value of b (612)=10 corresponds to a 5 W power increase command, the control model is linear in range [a,b] (616), and the base station decides that the power transmission level of a wireless terminal should be increased by 5 W, and would normally set y (630)=10. However, with scale factor synchronization now active, the base station may use the past channel report feedback information including, e.g., downlink quality channel reports including pilot feedback information to calculate a scale factor adjustment to apply to the power control command before transmission. For example, in this exemplary case, the scale factor adjustment would be a factor of 10/8 so that the transmitted power control command from the base station to the wireless terminal would be y (630)=12.5. The wireless terminal would interpret the command signal as y=10.0 and increase its power by 5 W as originally desired.

Figure 8:
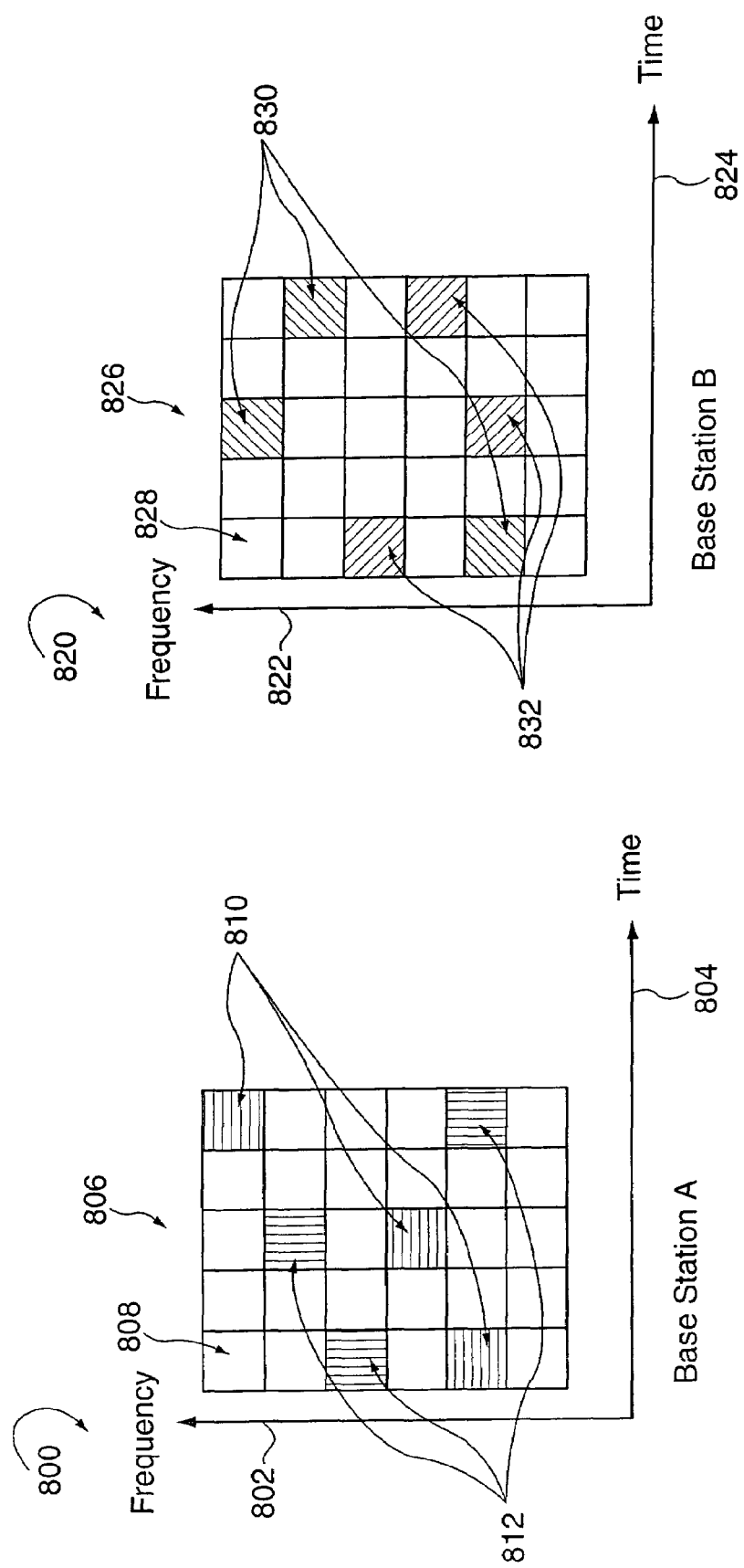
FIG. 8 illustrates exemplary power control tone-symbol sequences, in accordance with the invention, for four exemplary wireless terminals, two of which are connected to a first base station, and two of which are connected to a second base station.

In an exemplary OFDM system, the base station regularly sends power control commands to the wireless terminals, each of which maintains an active connection with the base station. The set of the tone-symbols used to carry the power control commands for a given wireless terminal is called a power control tone-symbol sequence. FIG. 8 illustrates the power control tone-symbol sequences of four wireless terminals, two of which are connected to one base station and the other two connected to another base station. In one embodiment, the tones of a power control tone-symbol sequence hop from time to time. Power control tone-symbol hopping sequences 236 may, and in some embodiments are, associated with a base station's terminal identifiers 244. Graph 800 of FIG. 8, corresponding to a first base station, base station A, includes a vertical axis 802 representing frequency and a horizontal axis 804 representing time. Air link resource 806 includes 30 tone-symbol locations, e.g. exemplary tone-symbol location 808. Air link resource 806 includes 3 power control tone-symbols for a wireless terminal with base station A terminal identifier #1, represented by squares with horizontal line shading 810, and 3 power control tone-symbols for a wireless terminal with base station A terminal identifier #2, represented by squares with vertical line shading 812. The three power control tone-symbols 810, observed to follow a specific relationship in frequency and time, may constitute a power control tone-symbol sequence of terminal identifier #1 for base station A. The three power control tone-symbols 812, observed to follow a specific relationship in frequency and time, may constitute a power control tone-symbol sequence of terminal identifier #2 for base station A. Graph 820 of FIG. 8, corresponding to a second base station, base station B, includes a vertical axis 822 representing frequency and a horizontal axis 824 representing time. Air link resource 826 includes 30 tone-symbol locations, e.g. exemplary tone-symbol location 828. Air link resource 826 includes 3 power control tone-symbols for a wireless terminal with base station B terminal identifier #3, represented by squares with ascending line shading from left to right 830, and 3 power control tone-symbols for a wireless terminal with base station B terminal identifier #4, represented by squares with descending line shading from left to right 832. The three power control tone-symbols 830, observed to follow a specific relationship in frequency and time, may constitute a power control tone-symbol sequence of terminal identifier #3 for base station B. The three power control tone-symbols 832, observed to follow a specific relationship in frequency and time, may constitute a power control tone-symbol sequence of terminal identifier #4 for base station B. Moreover, the power control tone-symbol sequence, for a given wireless terminal, is a function of the terminal identifier 244, assigned by base station to the wireless terminal such that in a given base station, the power control tone-symbol sequence for any wireless terminal identifier 244 can be uniquely determined by both the base station and all the wireless terminals connected with the base station.

In a cellular system, the power control tone-symbol sequences are, in some embodiments, different from one base station to another such that the interference between power control signals of adjacent cells is averaged. In addition, for any given wireless terminal, the successive power control commands may not always arrive with a fixed inter-arrival time to further randomize the inter-cell interference.

In a sectorized base station implementation, in order to protect power control commands against interference between sectors, in some embodiments of the invention, when a tone-symbol is used in one sector as a power control tone-symbol, the same tone-symbol is not used in adjacent sector. The base station can coordinate the use of tones in the various sectors making such control possible.

Consider the following embodiment of power control tone-symbol sequences in a system. Suppose that there are totally N tones in the system. Thus, one can construct N tone hopping sequences, each of which has a periodicity of N OFDM symbol periods, which is called as a super slot. Suppose N=113. Index the OFDM symbol period as 1, 2, ..., 113. Suppose that tone-symbols of hopping sequences 1, 2, 3, 4 in OFDM symbols 1, ..., 7; 15, ..., 21; 29, ..., 35; 43, ..., 49; 57, ..., 63, 71, ... 77, 85, ..., 91, 99, ..., 105 are used to transmit the power control commands.

First assume that there are 28 distinct wireless terminal identifiers. Then, each of the wireless terminals has one power control tone-symbol in one slot, which consists of 14 contiguous OFDM symbols. In this case, the effective periodicity of the power control tone-symbol sequences is a super slot. Now consider two adjacent base stations A and B. Suppose that in one super slot, a power control tone-symbol of user 1 in base station A interferes with some tone-symbol, which is used by a strong interferer in base station B. Thus, the power control command of user 1 sees large interference and may not be reliably communicated. In this scenario, there is a distinct possibility that in the next super slots, the same tone symbol may see the same strong interferer again. As a result, the power control commands can be lost successively for the same user, and the interference effect is not averaged.

Now, assume that there are 31 (instead of 28) distinct wireless terminal identifiers. Then, terminals 1 to 28 are power controlled in the first slot; terminals 29, 30, 31, and 1 to 25 are power controlled in the second slot, and so forth. It can be seen that because of the misalignment of the numbers 28 and 31, the effective periodicity of the power control tone-symbol sequences is much larger than a super slot. In this case, if a power control tone-symbol of user 1 is hit by a strong interferer, then in the next super slot, the same tone-symbol can see a different interferer. Advantageously, the power control commands may not be lost successively for the same user, and the interference effect is averaged.

Figure 9:
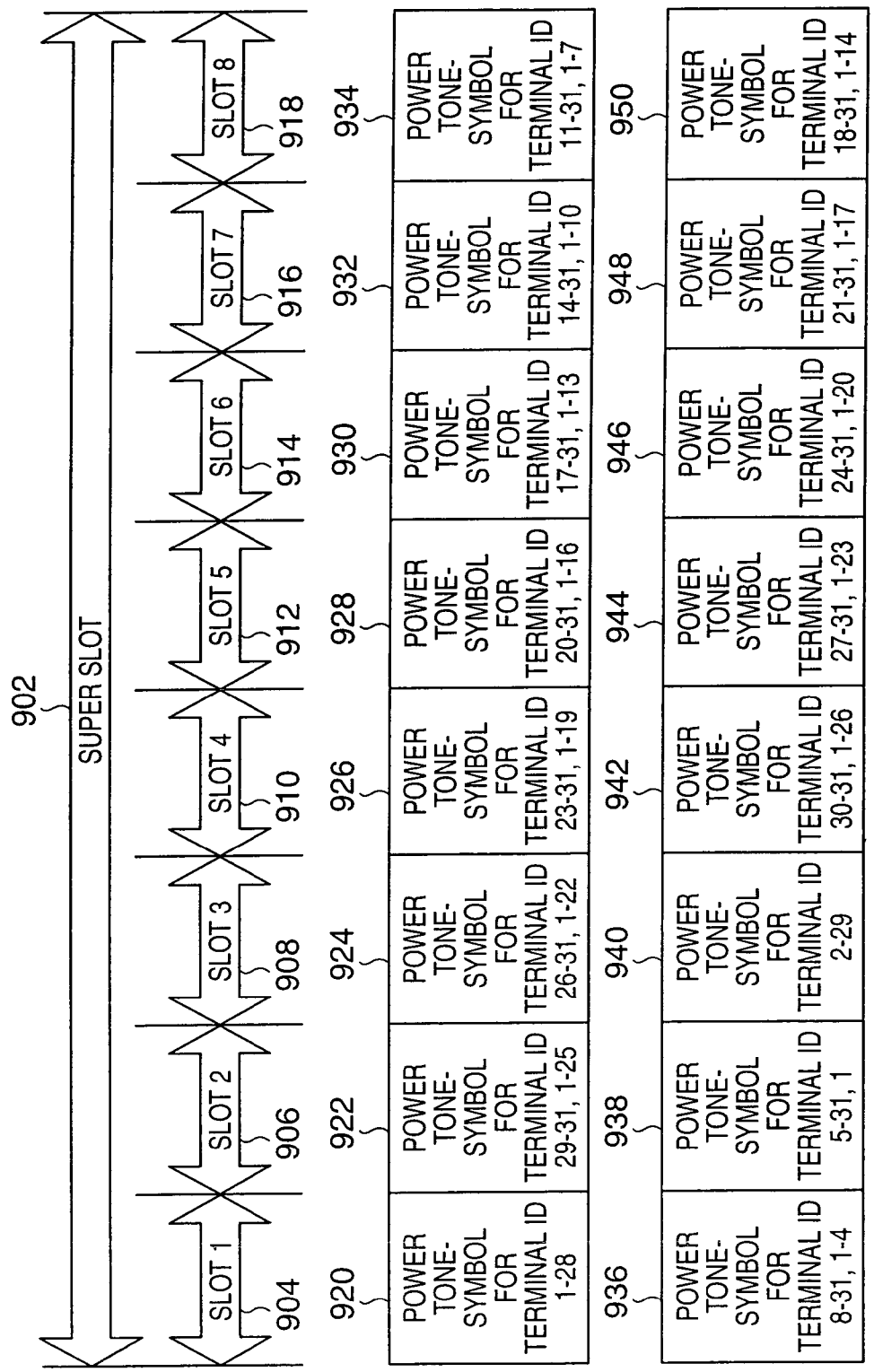
FIG. 9 illustrates an exemplary embodiment of the present invention, used to reduce the effects of interference, in which superslots are subdivided in slots, and the base station issues power control commands for a subset of the number of base station terminal IDs during each slot, where the subsets change from slot to slot.

FIG. 9 illustrates the exemplary embodiment described above. The base station is performing power control on 31 users or wireless terminals with base station terminal ID assignments 1-3. In FIG. 9 illustrates a superslot 902 including 8 slots: slot 1 904, slot 2 906, slot 3, 908, slot 4 910, slot 5 912, slot 6 914, slot 7 916, and slot 8 918. During each slot 904, 906, 908, 910, 914, 916, 918 of the superslot 902, the base station performs power control on a set of 28 distinct wireless terminals and may send one power control tone-symbol for each of the 28 distinct wireless terminals that are being controlled. The set of 28 users changes from slot to slot. Boxes 920, 922, 924, 926, 928, 930, 932, and 934 below slots 904, 906, 908, 910, 912, 914, 916, and 918, respectively, list the terminal IDs for the users that receive a power control tone-symbol during the respective slot. Boxes 920, 922, 924, 926, 928, 932, 930 and 934 correspond to a first superslot. Boxes 936, 938, 940, 942, 944, 946, 948, and 950 below slots 904, 906, 908, 910, 912, 914, 916, and 918, respectively, list the users that receive a power control tone-symbol during the respective slot. Boxes 936, 938, 940, 942, 944, 946, 948 and 950 correspond to a second superslot. Note that in each slot, e.g., slot 1 904, the subsets of terminal IDs 920 that may receive a power control tone-symbol in the first superslot is different than the subset of terminal IDs 936 that may receive a power control tone-symbol the second superslot.

Figure 10:
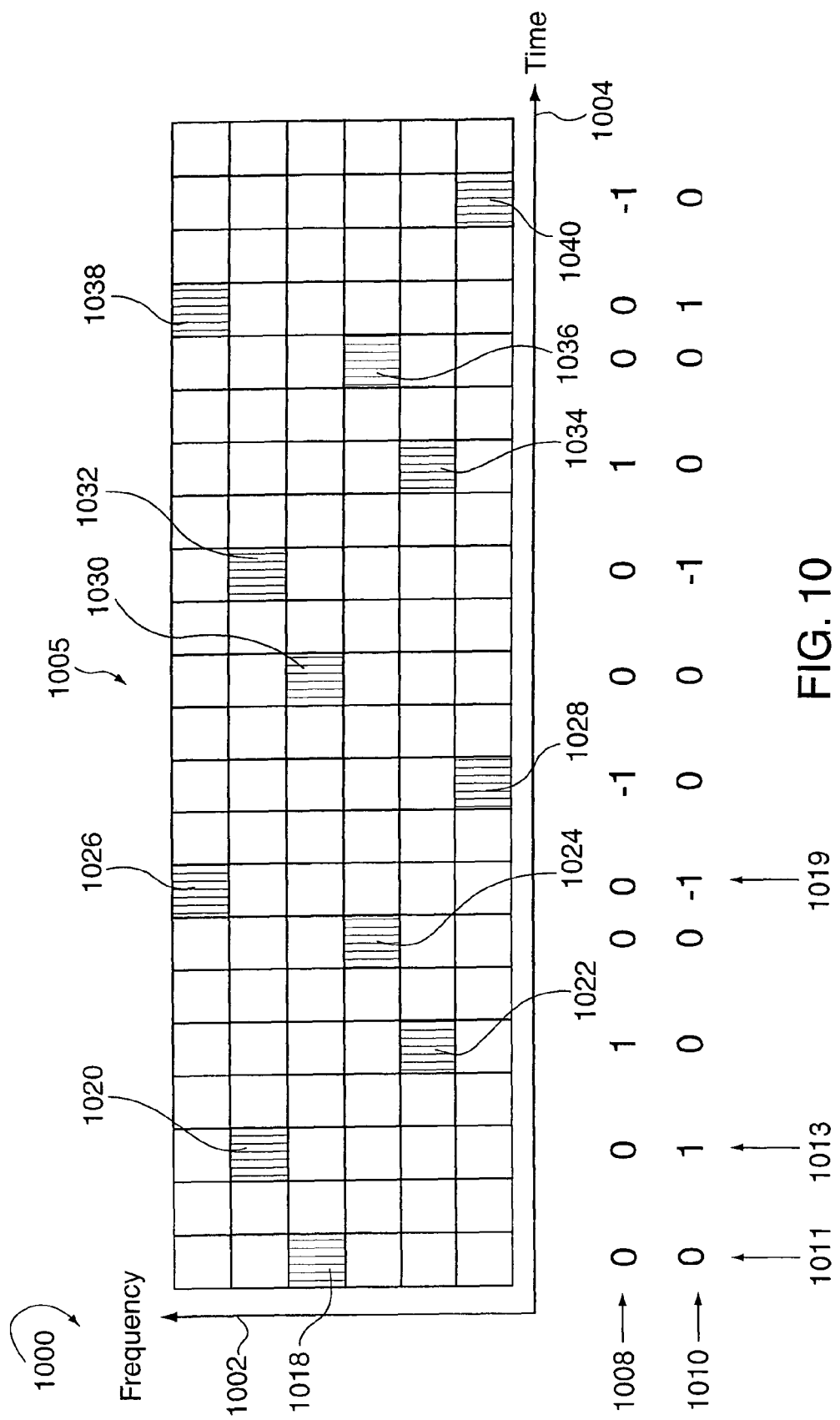
FIG. 10 illustrates an exemplary embodiment of the invention in which quadrature component of the power control tone-symbol is used to convey device, e.g., wireless terminal identify information in accordance with the present invention.

FIG. 10 illustrates an embodiment of the invention, where only one power control command is transmitted using a single tone-symbol. In the FIG. 10 embodiment, the power control command is transmitted in the in-phase component of the tone-symbol, and the quadrature component is used to transmit device identify information. FIG. 10 provides a simplified example where the base station's power control tone-symbol sequence for one terminal ID, e.g. terminal ID#1, is shown. FIG. 10 includes a graph 1000 with frequency on the vertical axis 1002, time on the horizontal axis 1004, and air link resource 1005, e.g. bandwidth over time, shown as 132 tone-symbols represented by squares. Air link resource 1005 includes a plurality of power control tone-symbols, 1018, 1020, 1022, 1024, 1026, 1028, 1030, 1032, 1034, 1036, 1038, 1040. Each power control tone-symbol, e.g., power control tone-symbol 1018, is represented by a square with vertical line shading. Each power control tone-symbol, e.g. 1018, shown represents a potential power control tone-symbol transmission in the power control tone-symbol sequence for terminal ID#1. Below graph 1000, two rows are shown: a first row 1008 and a second row 1010. A device identifier 249, such as an association with an IP address, unique to each wireless terminal, is pre-determined and known to each device, (wireless terminal) and the base stations. For each device identifier 249, a unique device ID sequence 347, sometimes referred to as a signature sequence, is pre-determined and known by the device (wireless terminal) and base stations. First row 1008 is an exemplary device ID sequence for exemplary device (wireless terminal) A. Second row 1010 is an exemplary device ID sequence for exemplary device (wireless terminal) B. If the base station has assigned device (wireless terminal) A to terminal ID #1, the device ID sequence values in first row 1008 are used to determine the transmitted signal in the quadrature component of the power tone-symbol shown above it. If the base station has assigned device (wireless terminal) B to terminal ID #1, the device ID sequence values in second row 1010 are used to determine the transmitted signal in the quadrature component of the power tone-symbol shown above it. Specifically, for a given device ID sequence 347, if the device ID sequence value is zero, and thus the quadrature component is not transmitted or set to zero, in most of the power control tone-symbols of the power control tone-symbol sequence. For example, in the device ID sequence for terminal A shown in first row 1008, the value is zero (0) for 8 out 12 times in the sequence. In those instances, where the device ID sequence value 347 is zero (0), e.g., first row 1008 and first column 1011, quadrature component is not transmitted or set to zero in the corresponding power control tone-symbol, e.g., tone-symbol 1018. If there is not a device (wireless terminal), associated with the base station's terminal identifier, e.g. terminal ID #1, the power control tone-symbols are not transmitted. If there is a device (wireless terminal) associated with the base station's terminal identifier, e.g. terminal ID#1, the base station transmission includes a quadrature component, called quadrature component signal, at a selected set of the tone-symbols, which are called quadrature-active tone-symbols. For the ID sequence for terminal A, specified in row 1008, tone symbols 1022, 1028, 1034, and 1040 are quadrature-active tone-symbols. For the ID sequence for terminal B, specified in row 1010, tone symbols 1020, 1026, 1032, and 1038 are quadrature-active tone-symbols. In some embodiments, the quadrature component signal is a +/− variable, where the variable may be a predetermined signal level, e.g. Z. For example, in FIG. 10, assume the base station has assigned device (wireless terminal) B to terminal ID#1, a second column 1013 has a value=1 in the device (wireless terminal) ID B sequence of row 1010, indicating that the base station should transmit quadrature-active power tone-symbol 1020 with a +Z level quadrature component for wireless terminal B. In FIG. 10, assume the base station has assigned device (wireless terminal) B to terminal ID#1, a fifth column 1015 has a value=1 in the device (wireless terminal) ID B sequence of row 1010, indicating that the base station should transmit quadrature-active power tone-symbol 1026 with a −Z level quadrature component for wireless terminal B. In accordance with the invention, both the quadrature component signal and the set of the quadrature-active tone-symbols are known to both the base station and the wireless terminal, and may be different from one wireless terminal to another. That is, the quadrature component signal and/or the set of quadrature-active tone-symbols can be a form of signature of the wireless terminal. FIG. 10 illustrates that the different quadrature component signal and the different set of quadrature-active tone-symbols in two cases where the power control tone-symbol sequence is used by different wireless terminals.

The use of the quadrature component for transmitting device (wireless terminal) identity information is useful for system maintenance. Suppose that at a given time, from the base station's perspective, a particular terminal identifier, e.g., exemplary terminal ID #1, is idle, e.g. unassigned. However, a device, e.g., wireless terminal, A thinks that it is connected with the base station with terminal identifier #1. This state disconnection can be because of signaling error in the past between the base station and the device (wireless terminal) A and may not be easily detected and resolved. As terminal identifier #1 is idle, the base station does not send any signal in either the in-phase or the quadrature component of the tone-symbols of the corresponding power control tone-symbol sequence. On the other hand, device (wireless terminal) A is receiving the tone-symbols and can detect that there is no signal transmitted in the expected power control tone-symbols for terminal ID #1. Without the above embodiment of using the quadrature component signal for conveying device ID information, it is hard for the device (wireless terminal) A to distinguish whether the lack of signal is because the base station thinks terminal ID #1 is idle, in which case the device (wireless terminal) A should drop out and re-access the base station, or that the base station does not intend to adjust the power, in which case the device (wireless terminal) A should not take any action. With the above embodiment, as the device (wireless terminal) A does not receive its signature quadrature component signal, it can figure out that terminal ID #1 is idle and thus take proper actions, e.g. drop out and re-access the base station.

Consider another exemplary scenario. Suppose that at a given time, from the base station's perspective, a particular terminal identifier, e.g. exemplary terminal ID #1, is assigned to a first device (wireless terminal) A. However, a second device (wireless terminal) B thinks that it is connected with the base station with terminal identifier #1. In such a case, device (wireless terminal) B receives the signature quadrature component signal of device (wireless terminal) A, which is different from its own signature signal. Consequently, device (wireless terminal) B recognizes that it is not currently assigned terminal identifier #1, drops out and may re-access the base station.

The present invention may be implemented in hardware, software, or a combination of hardware and software. For example some aspects of the invention may be implemented as processor executed program instructions. Alternately, or in addition, some aspects of the invention may be implemented as integrated circuits, such as, for example, ASICs.

Numerous additional variations of the methods and apparatus of the present invention described above will be apparent to those skilled in the art in view of the above descriptions of the invention. Such variations are to be considered within the scope of the invention.

What is claimed is:

1. A communications method for use in an orthogonal frequency division multiplexed system, the method comprising:

modulating, using phase modulation, first control information on a first component of a single tone to generate a first single tone control signal, said first single tone control signal including the first component and a second component, said first and second components having a phase difference of 90 degrees, said second component communicating information which is separate from said first control information or being null; and transmitting said first single tone control signal using said single tone during a single orthogonal frequency division multiplexed symbol transmission time period.

2. The method of claim 1, wherein said first control information is transmission power control information corresponding to a first wireless terminal.

3. The method of claim 1, wherein said first control information is transmission frequency control information corresponding to a first wireless terminal.

4. The method of claim 1, wherein said first control information is transmission timing control information corresponding to a first wireless terminal.

5. The method of claim 2, wherein said first single tone control signal indicates one of an increase and a decrease, said step of modulating including setting the phase of the first single tone control signal to a first value if said first single tone control signal indicates an increase and to a second value if said first single tone control signal indicates a decrease, said second value having a 180 degree difference from the first value.

6. The method of claim 1, wherein said first component is an In-phase component and said second component is a Quadrature component, said first control information being modulated on a first single one of said In-phase and Quadrature components, the method further comprising:

modulating second control information corresponding to a second wireless terminal on said single tone, said second control information being said separate information, said second control information being modulated on the second single one of said In-phase and Quadrature components, said second single one of said In-phase and Quadrature components being different from said first single one of said In-phase and Quadrature components.

7. The method of claim 5, further comprising operating said first wireless terminal to receive said first single tone control signal and adjusting a transmission power level as a function of the first control information modulated on said first single tone control signal.

8. The method of claim 6, wherein the second single one of said In-phase and Quadrature phase components is transmitted with no more than 10% of the power that is used to transmit said first single one of said In-phase and Quadrature components.

9. The method of claim 1, wherein the power transmitted on the second signal one of said In-phase and Quadrature components is zero.

10. The method of claim 6, wherein said step of modulating second control information includes performing an amplitude modulation operation to modulate said second control information on said second single one of said In-phase and Quadrature components, said modulation for said second single one of said In-phase and Quadrature components including assigning, as a function of said first control information, a single value from a set of at least 3 possible values.

11. The method of claim 10, wherein at least one of the 3 possible values is zero indicating no change in transmission power is to be made by said first wireless terminal.

12. The method of claim 10, wherein said set of possible values includes a predetermined interval of possible values.

13. The method of claim 1, further comprising:

modulating control information on a single tone indicating no change during a second period of time which is different from a first period of time corresponding to said first control information, said modulating generating a second single tone control signal, said second single tone control signal having an amplitude of zero; and transmitting said second single tone control signal during a single orthogonal frequency division multiplexed symbol transmission time period.

14. The method of claim 6, wherein modulating said second control information includes performing amplitude modulation.

15. The method of claim 14, further comprising:

multiplying the amplitude modulated one of the In-phase and Quadrature components by a first scaling factor, said first scaling factor being a function of downlink quality report information received from the wireless terminal to which the modulated one of the In-phase and Quadrature components corresponds.

16. A communications method for use in an orthogonal frequency division multiplexed system, the method comprising:

modulating first control information on a single tone to generate a first control signal; and transmitting said first control signal using said single tone during a single orthogonal frequency division multiplexed symbol transmission time period;

wherein said first control information is transmission power control information corresponding to a first wireless terminal;

wherein said first control signal includes an In-phase component and a Quadrature component, said first control information being modulated on a first single one of said In-phase and Quadrature components;

wherein said modulating includes performing amplitude modulation, the method further comprising:

multiplying the amplitude modulated one of the In-phase and Quadrature components by a first scaling factor, said first scaling factor being a function of downlink quality report information so far received from the wireless terminal to which the modulated one of the In-phase and Quadrature components corresponds; and increasing said first scaling factor in response to receiving downlink quality information indicative of a decrease in downlink channel quality and decreasing said first scaling factor in response to receiving downlink quality information indicative of a increase in downlink channel quality.

17. The method of claim 16, further comprising:

operating the wireless terminal to receive the scaled amplitude modulated signal; and operating the wireless terminal to multiply the received signal by a second scaling factor that is a function of the downlink quality information previously sent by said wireless terminal.

18. The method of claim 17, decreasing the second scaling factor in response to an increase in downlink channel quality and increasing the second scaling factor in response to a decrease in downlink channel quality.

19. The method of claim 2, further comprising:
periodically transmitting a first set of said modulated power control signals corresponding to a first wireless terminal, at least some of said first set of modulated power control signals being modulated on different tones during different orthogonal frequency division multiplexed symbol transmission time periods.

20. The method of claim 19, wherein the tones used to modulate said first set of modulated power control signals is determined by a first predetermined hopping sequence.

21. The method of claim 20, wherein the first predetermined hopping sequence corresponds to a terminal identifier associated with the first wireless terminal.

22. A communications method for use in an orthogonal frequency division multiplexed system, the method comprising:
modulating first control information on a single tone to generate a first control signal;
transmitting said first control signal using said single tone during a single orthogonal frequency division multiplexed symbol transmission time period;
wherein said first control information is transmission power control information corresponding to a first wireless terminal,
the method further comprising:
periodically transmitting a first set of said modulated power control signals corresponding to a first wireless terminal, at least some of said first set of modulated power control signals being modulated on different tones during different orthogonal frequency division multiplexed symbol transmission time periods;
wherein the tones used to modulate said first set of modulated power control signals is determined by a first predetermined hopping sequence; and
wherein said first wireless terminal uses a second predetermined hopping sequence to select tones for data communication purposes, the periodicity of the second predetermined hopping sequence being shorter than the periodicity of the first predetermined hopping sequence.

23. The method of claim 22, wherein the periodicity of the second predetermined hopping sequence is at most half of the periodicity of the first predetermined hopping sequence.

24. The method of claim 1,
wherein the first component is a Quadrature signal component and the second component is an In-phase signal component;
wherein one of the In-phase and Quadrature signal components are not used, the method further comprising:
operating the wireless terminal to ignore the received power control information when the unused one of the In-phase and Quadrature components includes power above a preselected threshold.

25. The method of claim 6, further comprising:
transmitting a plurality of power control signals to said first wireless terminal, over a period of time; and
transmitting a periodic device identifier signal on the second single one of the In-phase and Quadrature signal components of at least 50% less frequently than the power control signals transmitted to said first wireless terminal.

26. A communications method for use in an orthogonal frequency division multiplexed system, the method comprising:
modulating first control information on a single tone to generate a first control signal; and
transmitting said first control signal using said single tone during a single orthogonal frequency division multiplexed symbol transmission time period;
wherein said first control information is transmission power control information corresponding to a first wireless terminal;
wherein said first control signal includes an In-phase component and a Quadrature component, said first control information being modulated on a first single one of said In-phase and Quadrature components, the method further comprising:
transmitting a plurality of power control signals to said first wireless terminal over a period of time; and
transmitting a periodic device identifier signal on the second single one of the In-phase and Quadrature signal components of at least 50% less frequently than the power control signals transmitted to said first wireless terminal; and
wherein said single orthogonal frequency division multiplexed symbol transmission time period during which said periodic device identifier is transmitted is a function of a wireless device identifier unique to said first wireless terminal.

27. The method of claim 26, wherein the value of the periodic device identifier at any given time is a function of a wireless device identifier unique to said first wireless terminal.

28. The method of claim 6,
wherein one of the possible modulated signal values corresponds to a control command indicating no change in power; and
wherein transmitting said first control information includes transmitting said single tone with zero power when said first control information indicates no change in power.

29. The method of claim 1, wherein said single tone control signal is transmitted in a first sector corresponding to a base station, the method comprising:
operating the base station to control a second sector adjacent to said first base station to leave the tone used by said first single tone control signal unused in said second sector when said first single tone control signal is transmitted.

30. A communications apparatus for use in an orthogonal frequency division multiplexed communications system including a wireless terminal, the communications apparatus comprising:
a modulator for modulating, using phase modulation, first control information on a first component of a single tone to generate a first single tone control signal, said first single tone control signal including the first component and a second component, said first and second components having a phase difference of 90 degrees, said second component communicating information which is separate from said first control information or being null; and
a transmitter coupled to said modulator for transmitting said first single tone control signal using said single tone during a single orthogonal frequency division multiplexed symbol transmission time period.

31. The communications apparatus of claim 30, wherein said first control information is one of transmission power control information, transmission frequency control information, and transmission timing control information corresponding to said wireless terminal.

32. The communications apparatus of claim 31,
wherein said first single tone control signal includes an In-phase component and a Quadrature component; and
wherein said modulator is an amplitude modulator for amplitude modulating first control information on a first single one of said In-phase and Quadrature components.

33. The communications apparatus of claim 32, wherein said modulator further modulates second control information corresponding to a second wireless terminal on said single tone, on a second single one of said In-phase and Quadrature components, said second single one of said In-phase and Quadrature components being different from said first single one of said In-phase and Quadrature components.

34. The communications apparatus of claim 32, wherein the power transmitted on the second single one of said In-phase and Quadrature components is zero.

35. The communications apparatus of claim 32, wherein said modulator includes
means for mapping said first control information to a single value from a set of at least 3 possible values which may be amplitude modulated on said first one of said In-phase and Quadrature phase signal components; and
wherein at least one of the 3 possible values is zero indicating no change in transmission power is to be made by said wireless terminal.

36. The communications apparatus of claim 32, further comprising:
a scaling device for multiplying the amplitude modulated one of the In-phase and Quadrature components by a first scaling factor, said first scaling factor being a function of downlink quality report information so far received from the wireless terminal to which the modulated one of the In-phase and Quadrature components corresponds.

37. A communications apparatus for use in an orthogonal frequency division multiplexed communications system including a wireless terminal, the communications apparatus comprising:
a modulator for modulating first control information on a single tone to generate a first control signal; and
a transmitter coupled to said modulator for transmitting said first control signal using said single tone during a single orthogonal frequency division multiplexed symbol transmission time period;
wherein said first control information is one of transmission power control information, transmission frequency control information, and transmission timing control information corresponding to said wireless terminal;
wherein said first control signal includes an In-phase component and a Quadrature component;
wherein said modulator is an amplitude modulator for amplitude modulating first control information on a first single one of said In-phase and Quadrature components, the apparatus further comprising:
a scaling device for multiplying the amplitude modulated one of the In-phase and Quadrature components by a first scaling factor, said first scaling factor being a function of downlink quality report information so far received from the wireless terminal to which the modulated one of the In-phase and Quadrature components corresponds;
means for increasing said first scaling factor in response to receiving downlink quality information indicative of a decrease in downlink channel quality and decreasing said first scaling factor in response to receiving downlink quality information indicative of a increase in downlink channel quality.

38. The communications apparatus of claim 32, further comprising:
means for allocating tones used to transmit power control signals according to a first predetermined frequency hopping pattern said tones assigned according to the first frequency hopping pattern including a first set of modulated power control signals, at least some of said first set of modulated power control signals being modulated on different tones during different orthogonal frequency division multiplexed symbol transmission time periods.

39. The communications apparatus of claim 38, wherein the first predetermined hopping sequence corresponds to a terminal identifier associated with the wireless terminal.

40. A communications apparatus for use in an orthogonal frequency division multiplexed communications system including a wireless terminal, the apparatus comprising:
a modulator for modulating first control information on a single tone to generate a first control signal; and
a transmitter coupled to said modulator for transmitting said first control signal using said single tone during a single orthogonal frequency division multiplexed symbol transmission time period;
wherein said first control information is one of transmission power control information, transmission frequency control information, and transmission timing control information corresponding to said wireless terminal;
a tone allocation module for allocating tones used to transmit power control signals according to a first predetermined frequency hopping pattern said tones assigned according to the first frequency hopping pattern including a first set of modulated power control signals, at least some of said first set of modulated power control signals being modulated on different tones during different orthogonal frequency division multiplexed symbol transmission time periods;
wherein said first control signal includes an In-phase component and a Quadrature component;
wherein said modulator is an amplitude modulator for amplitude modulating first control information on a first single one of said In-phase and Quadrature components; and
wherein tones are allocated for transmitting data to said wireless terminal according to a second predetermined hopping sequence, the periodicity of the second predetermined hopping sequence being shorter than the periodicity of the first predetermined hopping sequence.

41. The communications apparatus of claim 32, wherein said transmitter transmits a plurality of power control signals to said first wireless terminal over a period of time; and
includes means for transmitting a periodic device identifier signal on the second single one of the In-phase and Quadrature signal components on less than 50% of the power control signals transmitted to said wireless terminal.

42. A communications apparatus for use in an orthogonal frequency division multiplexed communications system including a wireless terminal, the apparatus comprising:
a modulator for modulating first control information on a single tone to generate a first control signal; and
a transmitter coupled to said modulator for transmitting said first control signal using said single tone during a single orthogonal frequency division multiplexed symbol transmission time period;
wherein said first control information is one of transmission power control information, transmission frequency control information, and transmission timing control information corresponding to said wireless terminal;

wherein said first control signal includes an In-phase component and a Quadrature component;
wherein said modulator is an amplitude modulator for amplitude modulating first control information on a first single one of said In-phase and Quadrature components;
wherein said transmitter transmits a plurality of power control signals to said first wireless terminal over a period of time; and includes means for transmitting a periodic device identifier signal on the second single one of the In-phase and Quadrature signal components on less than 50% of the power control signals transmitted to said wireless terminal; and
wherein said single orthogonal frequency division multiplexed symbol transmission time period during which said periodic device identifier is transmitted is a function of a wireless device identifier unique to said wireless terminal.

43. A communications apparatus for use in an orthogonal frequency division multiplexed communications system including a wireless terminal, the apparatus comprising:
a modulator for modulating first control information a single tone to generate a first control signal; and
a transmitter coupled to said modulator for transmitting said first control signal using said single tone during a single orthogonal frequency division multiplexed symbol transmission time period;
wherein said first control information is one of transmission power control information, transmission frequency control information, and transmission timing control information corresponding to said wireless terminal;
wherein said first control signal includes an In-phase component and a Quadrature component;
wherein said modulator is an amplitude modulator for amplitude modulating first control information on a first single one of said In-phase and Quadrature components;
wherein said transmitter transmits a plurality of power control signals to said first wireless terminal over a period of time; and includes means for transmitting a periodic device identifier signal on the second single one of the In-phase and Quadrature signal components on less than 50% of the power control signals transmitted to said wireless terminal; and
wherein the value of the periodic device identifier at any given time is a function of a wireless device identifier unique to said first wireless terminal.

44. The communications apparatus of claim 32,
wherein one of the possible modulated signal values corresponds to a control command indicating no change in power; and
wherein transmitting said first control information includes transmitting said signal tone with zero power when said first control information indicates no change in power.

45. The communications apparatus of claim 32, wherein said apparatus is a sectorized base station and wherein said transmitter is a transmitter in a sector of the sectorized base station, said apparatus including:
a control module for controlling a second sector adjacent to said first base station to leave the tone used by said first power control signal unused in said second sector when said first single tone control signal is transmitted.

46. A method of operating a wireless terminal in an orthogonal frequency division multiplexed communications system, the method comprising:
periodically receiving control signals corresponding to said wireless terminal, each control signal having control information of a first type, corresponding to one of three different values, first and third ones of said three different values being communicated using phase, a second one of said three different values being communicated as a null value; and
determining an adjustment to be made based on whether a received control signal communicates a first, second or third value, said adjustment corresponding to the control information type.

47. The method of claim 46, wherein said first type of information is one of power control information, timing control information and frequency control information.

48. The method of claim 46, wherein said first type of control information is power control information, the method further comprising:
operating the wireless terminal to perform a transmission power adjustment operation in response to the determined adjustment.

49. The method of claim 47, wherein a magnitude of approximately zero of a received control signal indicates no transmission power adjustment is to be made.

50. A method of operating a wireless terminal in an orthogonal frequency division multiplexed communications system, the method comprising:
periodically receiving control signals corresponding to said wireless terminal, each control signal having control information of a first type, corresponding to one of at least three different values, said control signal being received on a first single one of an In-phase component and a Quadrature phase component of a single tone during a single orthogonal frequency division multiplexed symbol transmission time period;
determining from said first single one of said In-phase and Quadrature phase signal components of each received control signal an adjustment to be made, said adjustment corresponding to the control information type;
checking a signal transmitted on a second single one of the In-phase and Quadrature phase components to determine if said single orthogonal frequency division multiplexed symbol transmission time period during which said signal is transmitted and the value of said signal are a function of a wireless device identifier unique to said wireless terminal; and
wherein said first type of information is one of power control information, timing control information and frequency control information.

51. The method of claim 50, further comprising:
disregarding the received power control information when said checking indicates said signal on the second one of the In-phase and Quadrature components is not for said wireless terminal.

52. The method of claim 47, wherein each received control signal includes an In-phase component and a Quadrature phase component, the method further comprising:
ignoring a received control signal when the power of the second one of the In-phase and Quadrature phase components of said received control signal is above a preselected threshold.

53. The method of claim 52, wherein said threshold is a power level threshold corresponding to a preselected level of signal noise.

54. A wireless terminal for use in an orthogonal frequency division multiplexed communications system, the wireless terminal comprising:
means for receiving control signals corresponding to said wireless terminal, each control signal having control information of a first type, corresponding to one of at least three different values, first and third ones of said three different values being communicated using phase, a second one of said three different values being communicated as a null value; and means for determining from the communicated value an adjustment to be made, said adjustment corresponding to the control information type.

55. The wireless terminal of claim 54, wherein said first type of information is one of power control information, timing control information and frequency control information.

56. The wireless terminal of claim 55, wherein said first type of control information is timing control information, the wireless terminal comprising:

means for performing a transmission power adjustment operation in response to receiving one of the first and third ones of said three different values.

57. The wireless terminal of claim 56, wherein a received null value indicates no transmission power adjustment is to be made.

58. A wireless terminal for use in an orthogonal frequency division multiplexed communications system, the wireless terminal comprising:

means for receiving control signals corresponding to said wireless terminal, each control signal having control information of a first type, corresponding to one of at least three different values, amplitude modulated on a first single one of an In-phase component and a Quadrature phase component of a single tone during a single orthogonal frequency division multiplexed symbol transmission time period; and means for determining from the magnitude of said first single one of said In-phase and Quadrature phase signal components of each received control signal an amount of an adjustment to be made, said adjustment corresponding to the control information type;

means for checking a signal transmitted on a second single one of the In-phase and Quadrature phase components to determine if said single orthogonal frequency division multiplexed symbol transmission time period during which said signal is transmitted and the value of said signal are a function of a wireless device identifier unique to said wireless terminal; and wherein said first type of information is one of power control information, timing control information and frequency control information.

59. The wireless terminal 58, further comprising:

disregarding the received power control information when said checking indicates said signal on the second one of the In-phase and Quadrature components is not for said wireless terminal.

60. The wireless terminal of claim 55, wherein one of the control signals is a power control signal and wherein the control information of the power control signal is communicated using a single one of an In-phase signal component and a Quadrature phase signal component of the power control signal, said wireless terminal further comprising:

means for disregarding a received power control signal when the power of the second one of the In-phase and Quadrature phase components of said signal is above a preselected threshold.

61. A device for use in an orthogonal frequency division multiplexed system, said device including a processor configured to control said device to implement a method, the method comprising:

modulating, using phase modulation, first control information on a first component of a single tone to generate a first single tone control signal, said first single tone control signal including the first component and a second component, said first and second components having a phase difference of 90 degrees, said second component communicating information which is separate from said first control information or being null; and transmitting said first single tone control signal using said single tone during a single orthogonal frequency division multiplexed symbol transmission time period.

62. The device of claim 61, wherein said first control information is transmission power control information corresponding to a first wireless terminal.

63. The device of claim 61, wherein said first control information is transmission frequency control information corresponding to a first wireless terminal.

64. A computer readable medium embodying machine executable instructions for controlling a device for use in an orthogonal frequency division multiplexed system, wherein executing the machine executable instructions implements a process, the process comprising:

modulating, using phase modulation, first control information on a first component of a single tone to generate a first single tone control signal, said first single tone control signal including the first component and a second component, said first and second components having a phase difference of 90 degrees, said second component communicating information which is separate from said first control information or being null; and transmitting said first single tone control signal using said single tone during a single orthogonal frequency division multiplexed symbol transmission time period.

65. The computer readable medium of claim 64, wherein said first control information is transmission power control information corresponding to a first wireless terminal.

66. The computer readable medium of claim 64, wherein said first control information is transmission frequency control information corresponding to a first wireless terminal.

67. A communications apparatus for use in an orthogonal frequency division multiplexed communications system including a wireless terminal, the communications apparatus comprising:

means for modulating, using phase modulation, first control information on a first component of a single tone to generate a first single tone control signal, said first single tone control signal including the first component and a second component, said first and second components having a phase difference of 90 degrees, said second component communicating information which is separate from said first control information or being null; and means for transmitting said first single tone control signal using said single tone during a single orthogonal frequency division multiplexed symbol transmission time period.

68. The communications apparatus of claim 67, wherein said first control information is one of transmission power control information, transmission frequency control information, and transmission timing control information corresponding to said wireless terminal.

69. The communications apparatus of claim 68, wherein said first single tone control signal indicates one of an increase and a decrease, said step of modulating including setting the phase of the first single tone control signal to a first value if said first single tone control signal indicates an increase and to a second value if said first single tone control signal indicates a decrease, said second value having a 180 degree difference from the first value.

70. A wireless terminal for use in an orthogonal frequency division multiplexed communications system, said wireless terminal including a processor configured to control said wireless terminal to implement a method, the method comprising;

periodically receiving control signals corresponding to said wireless terminal, each control signal having control information of a first type, corresponding to one of three different values, first and third ones of said three different values being communicated using phase, a second one of said three different values being communicated as a null value; and determining an adjustment to be made based on whether a received control signal communicates a first, second or third value, said adjustment corresponding to the control information type.

71. The wireless terminal of claim 70, wherein said first type of information is one of power control information, timing control information and frequency control information.

72. The wireless terminal of claim 70, wherein said first type of control information is power control information, and wherein the method further comprises:

performing a transmission power adjustment operation in response to the determined adjustment.

73. A computer readable medium embodying machine executable instructions for controlling a wireless terminal for use in an orthogonal frequency division multiplexed communications system, wherein executing the machine executable instructions implements a process, the process comprising:

periodically receiving control signals corresponding to said wireless terminal, each control signal having control information of a first type, corresponding to one of three different values, first and third ones of said three different values being communicated using phase, a second one of said three different values being communicated as a null value; and determining an adjustment to be made based on whether a received control signal communicates a first, second or third value, said adjustment corresponding to the control information type.

74. The computer readable medium of claim 73, wherein said first type of information is one of power control information, timing control information and frequency control information.

75. The computer readable medium of claim 73, wherein said first type of control information is power control information, and wherein the method further comprises:

performing a transmission power adjustment operation in response to the determined adjustment.

76. A wireless terminal for use in an orthogonal frequency division multiplexed communications system, the wireless terminal comprising:

a receiver for receiving control signals corresponding to said wireless terminal, each control signal having control information of a first type, corresponding to one of at least three different values, first and third ones of said three different values being communicated using phase, a second one of said three different values being communicated as a null value; and a determination module for determining from the communicated value, an adjustment to be made, said adjustment corresponding to the control information type.

77. The wireless terminal of claim 76, wherein said first type of information is one of power control information, timing control information and frequency control information.

78. The wireless terminal of claim 77, wherein said first type of control information is timing control information, the wireless terminal further comprising:

a power adjustment module for performing a transmission power adjustment operation in response to receiving one of the first and third ones of said three different values.

79. The method of claim 46, wherein the first and third ones of said three different values are communicated using first and third symbol values, said first and third symbol values differing in phase by 180 degrees, the second one of said three different values being communicated by a symbol value occurring on an axis extending between said first and third values, each of said first, second, and third values being on said axis.

* * * * *

UNITED STATES PATENT AND TRADEMARK OFFICE
CERTIFICATE OF CORRECTION

PATENT NO. : 7,420,939 B2
APPLICATION NO. : 10/641308
DATED : September 2, 2008
INVENTOR(S) : Rajiv Laroia et al.

It is certified that error appears in the above-identified patent and that said Letters Patent is hereby corrected as shown below:

Column 27, Claim 43, line 21, "information a single", should be --information on a single--

Signed and Sealed this

Twentieth Day of April, 2010

David J. Kappos
*Director of the United States Patent and Trademark Office*